Aug. 6, 1935.  E. E. KLEINSCHMIDT ET AL  2,010,158

SELECTIVE SIGNALING SYSTEM AND APPARATUS

Filed Oct. 14, 1930    10 Sheets-Sheet 1

INVENTORS
EDWARD E KLEINSCHMIDT
HOWARD L KRUM
BY LOUIS M POTTS
Strauch+Hoffman
ATTORNEYS INVENTORS
EDWARD E KLEINSCHMIDT
HOWARD L KRUM
LOUIS M POTTS
BY Strauch & Hoffman
ATTORNEYS.

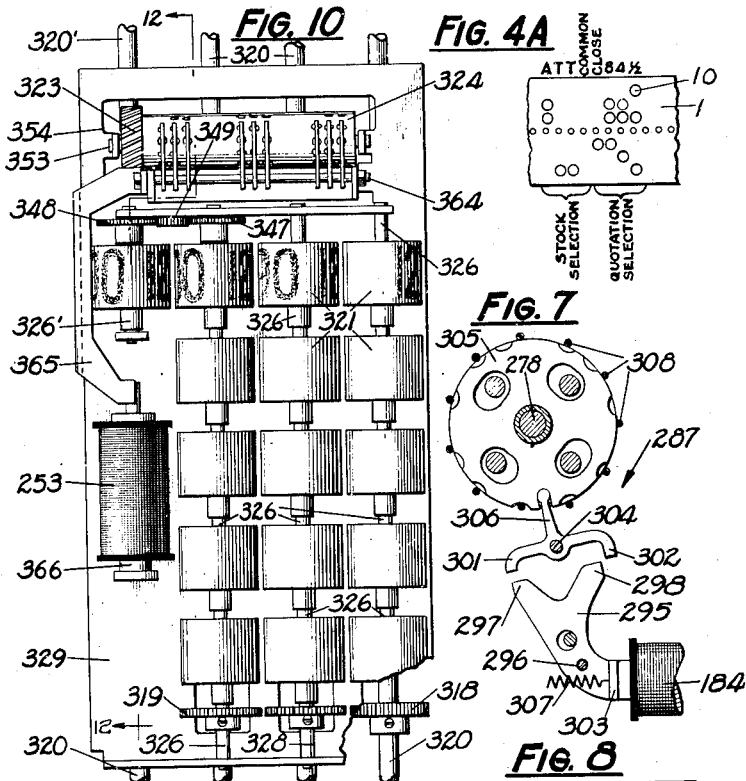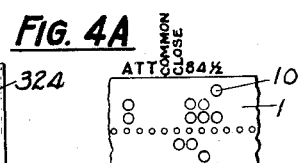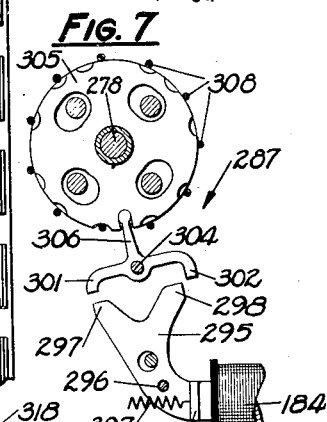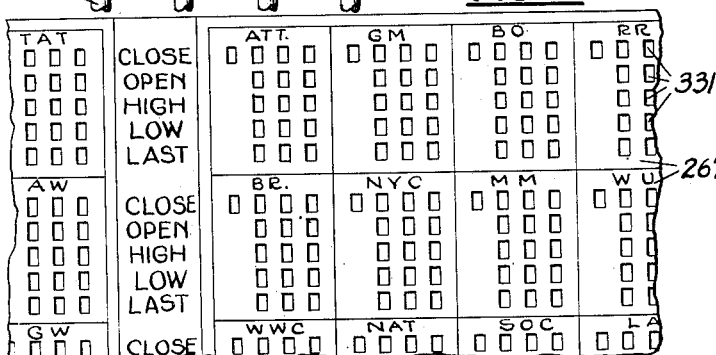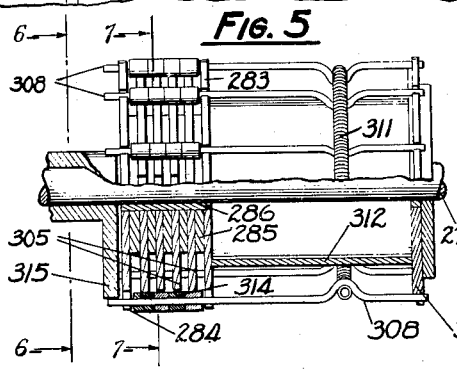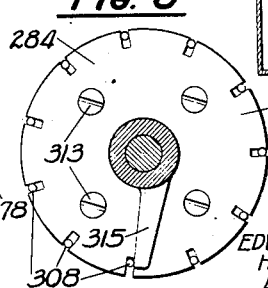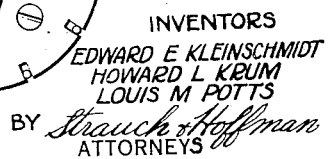

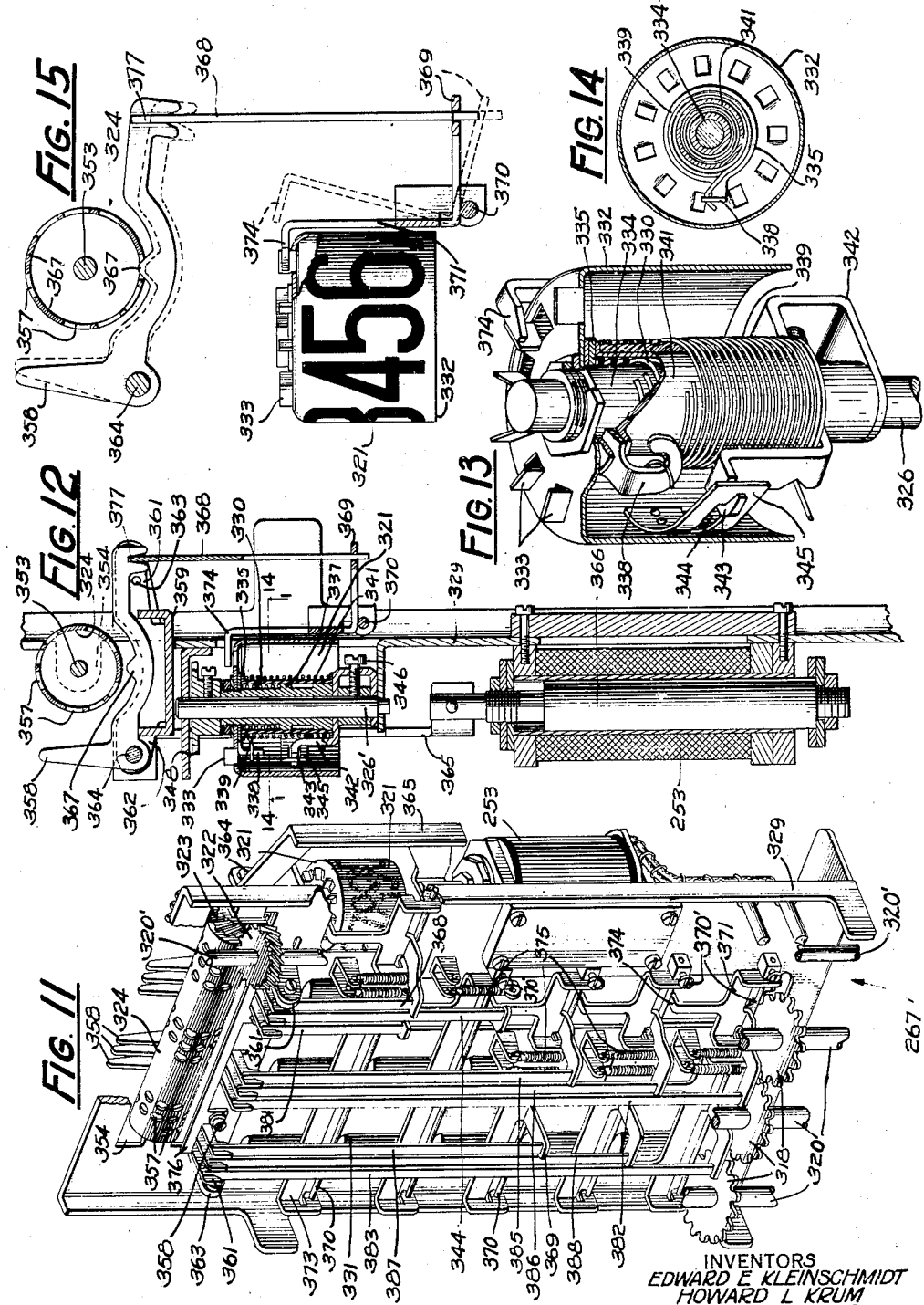

Aug. 6, 1935.　　　E. E. KLEINSCHMIDT ET AL　　　2,010,158
SELECTIVE SIGNALING SYSTEM AND APPARATUS
Filed Oct. 14, 1930　　　10 Sheets-Sheet 5

INVENTORS
EDWARD E KLEINSCHMIDT
HOWARD L KRUM
LOUIS M POTTS
Strauch Hoffman
ATTYS.

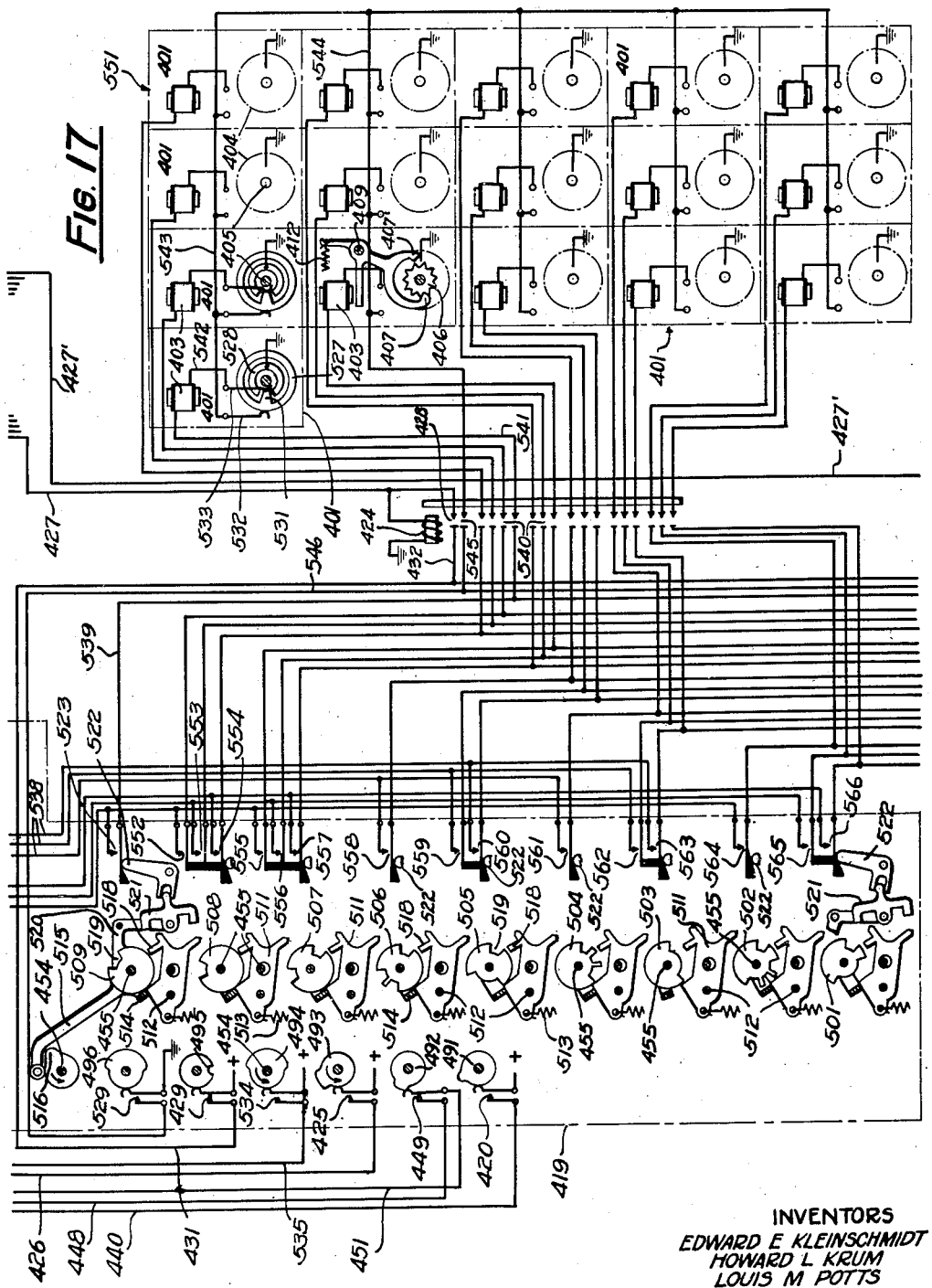

Aug. 6, 1935.　　E. E. KLEINSCHMIDT ET AL　　2,010,158
SELECTIVE SIGNALING SYSTEM AND APPARATUS
Filed Oct. 14, 1930　　10 Sheets-Sheet 7
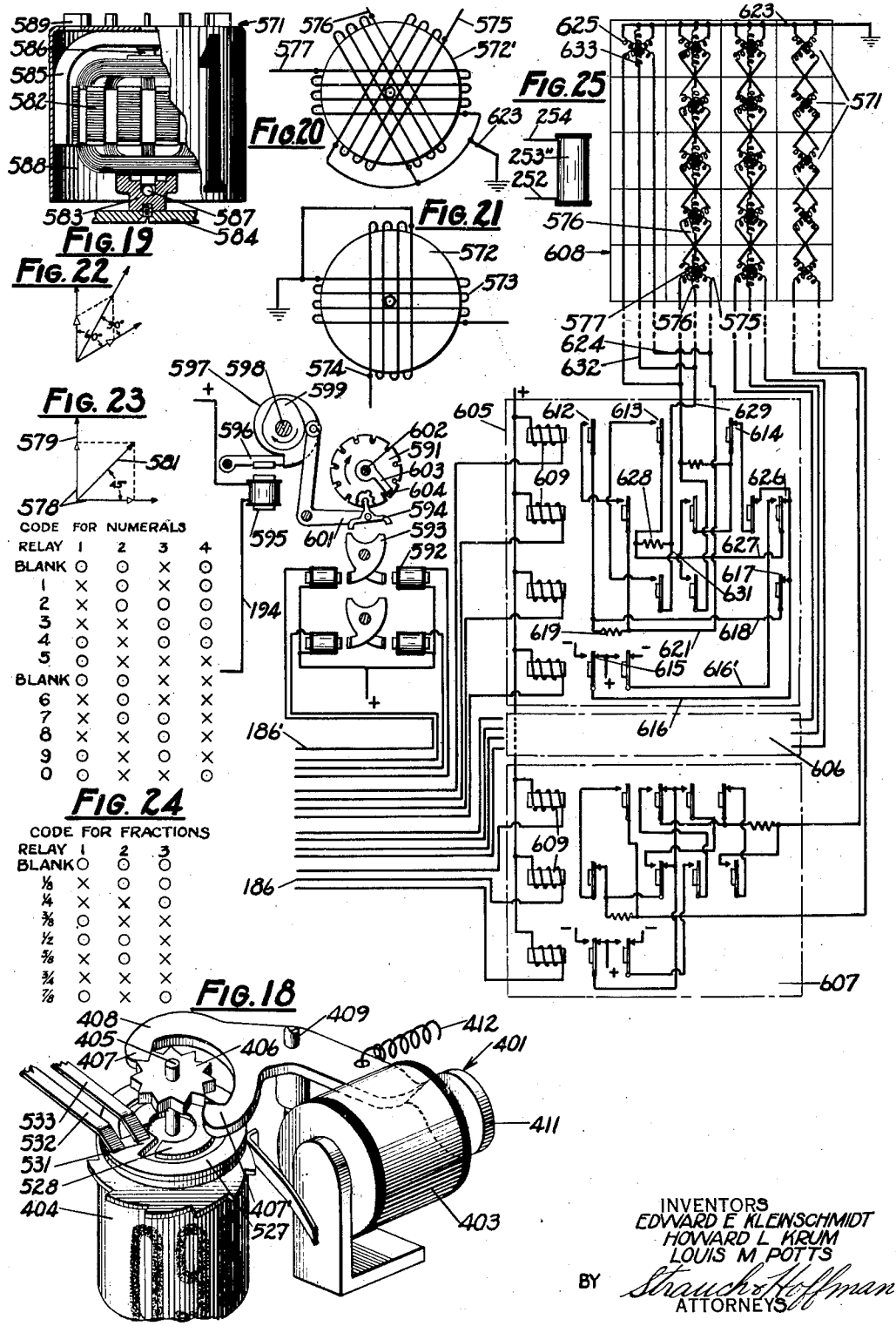
INVENTORS
EDWARD E. KLEINSCHMIDT
HOWARD L. KRUM
LOUIS M. POTTS
BY Strauch & Hoffman
ATTORNEYS

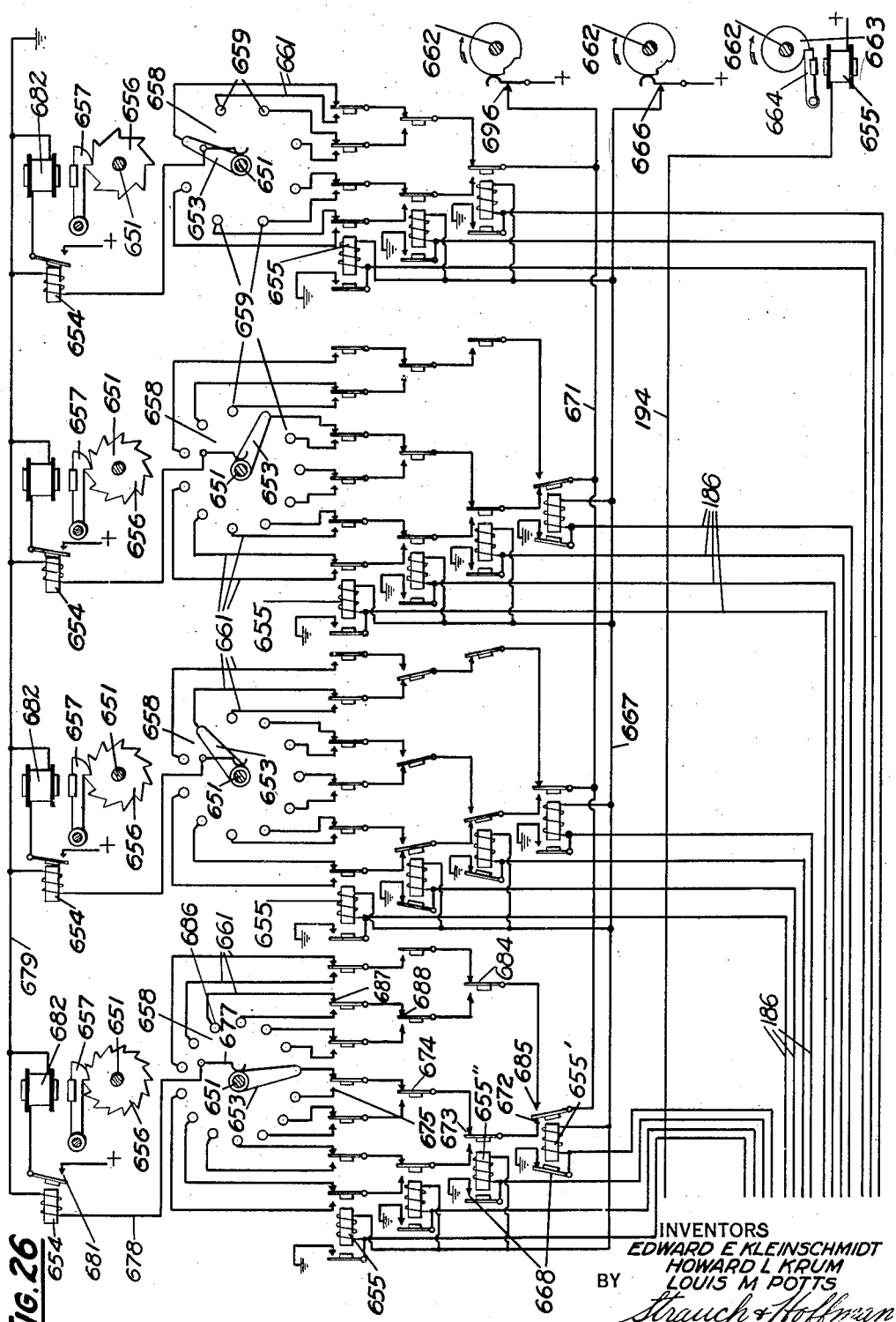

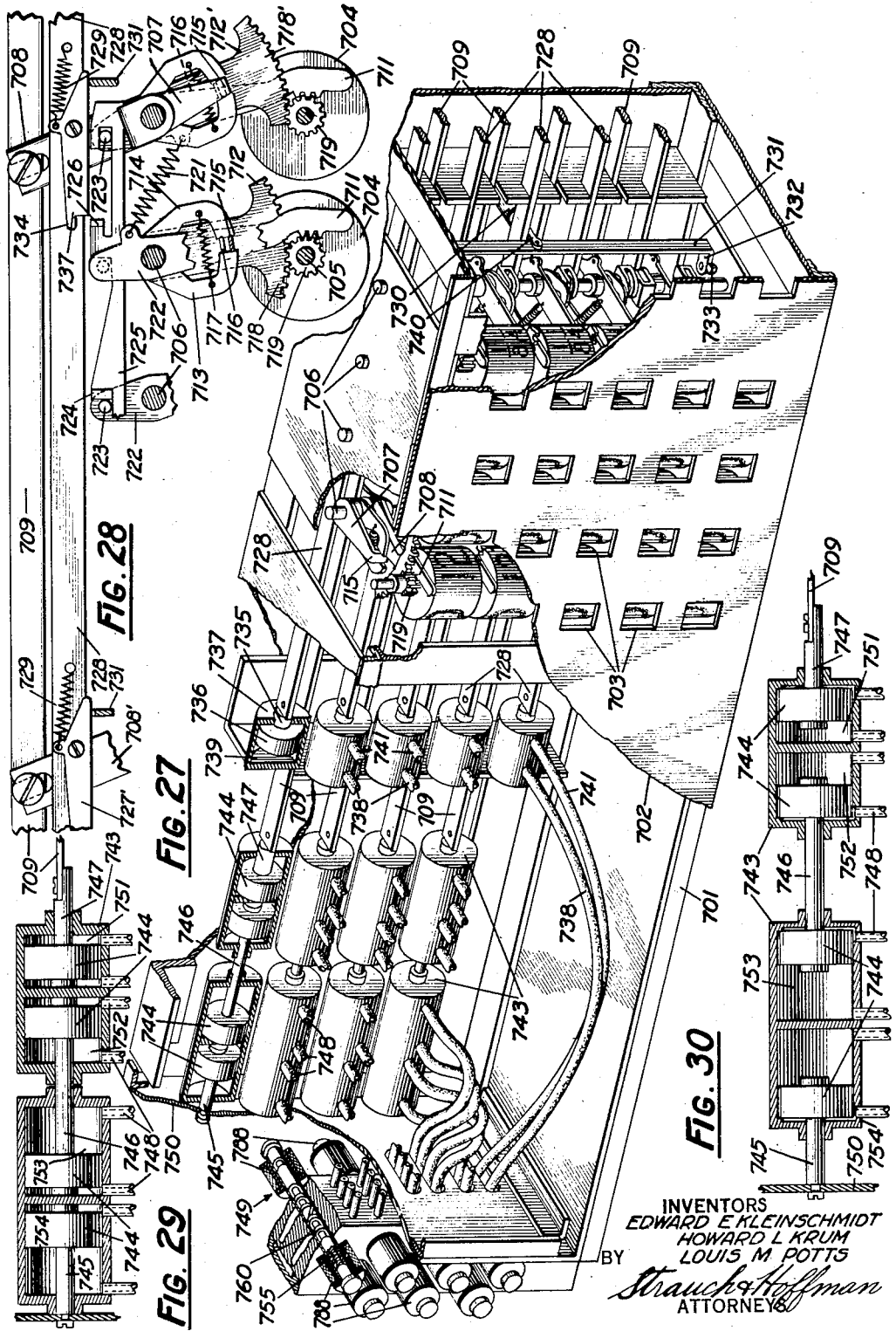

Aug. 6, 1935.  E. E. KLEINSCHMIDT ET AL  2,010,158
SELECTIVE SIGNALING SYSTEM AND APPARATUS
Filed Oct. 14, 1930  10 Sheets-Sheet 10

INVENTORS
EDWARD E KLEINSCHMIDT
HOWARD L KRUM
LOUIS M POTTS
BY
Strauch & Hoffman
ATTORNEYS Patented Aug. 6, 1935

2,010,158

UNITED STATES PATENT OFFICE 2,010,158

SELECTIVE SIGNALING SYSTEM AND APPARATUS

Edward E. Kleinschmidt, Howard L. Krum, and Louis M. Potts, Chicago, Ill., assignors to Teletype Corporation, Chicago, Ill., a corporation of Delaware Application October 14, 1930, Serial No. 488,664

7 Claims. (Cl. 177—353)

This invention relates to selective signaling systems and is especially adapted to the selective control of remotely disposed stock and commodities, boards from a central dispatching station.

The present practice of manually posting stock quotations by attendants has been rendered impractical by the development of tickers capable of exceedingly rapid operation. Such manual recordation has proved to be entirely inadequate to keep pace with the increased volume of business now being transacted. To handle this large volume of business, automatic means are necessary which will indicate the quotations as they are received, independently of any manual operation by an attendant.

A primary object of this invention is to adapt the efficient permutation code methods of modern printing telegraphs to the operation of quotation boards to give the necessary speed of operation. However, due to the large number of different items in many markets, it is impractical to provide a permutation code indicator for each digit or even for each item to be quoted commercially, and in accordance with the present invention, quotation boards are therefore provided in which a large number of indicators can be controlled from a single permutation device.

Another object of this invention is to provide a selective signaling system for indicating quotations at a plurality of remote stations under the control of a central dispatching station, which is simple, reliable and accurate.

Due to the very heavy traffic to be handled by such systems, it is an important object of this invention to provide novel overlap arrangements at the transmitting and receiving stations, whereby a greater amount of signal line time may be productively employed.

This invention further provides a stock quotation distribution system employing electrically controlled and selectively operated pneumatic means comprising novel electropneumatic selecting devices operable with the efficiency and reliability of recent telegraph selectors.

It is customary to designate on the stock board the attributes or indexes of each particular stock, such as "close", "open", "high", "low", and "last". A further object of this invention is to provide novel circuit arrangements for selectively operating simultaneously variant combinations of indexes or attributes of the stock items, to be quoted.

Further objects of this invention reside in the provision of novel transmitting, selecting and receiving apparatus in telegraph systems, which are particularly adapted for automatic distribution of stock and like quotations.

Other objects of this invention are such as will be attained by the combination of features hereinafter set forth and as pointed out in the appended claims.

In the drawings:

Figure 4a shows a sample section tape used to control the transmitter.

Figure 5 is a partial elevation and partial section of the code disc selector.

Figure 6 is a cross section of the code disc selector taken on line 6—6 in Figure 5.

Figure 7 is a cross section of the code disc selector taken on line 7—7 in Figure 5.

Figure 8 is a front elevation of a portion of a preferred form of stock board.

Figure 9 is a transverse section of a preferred form of stock board.

Figure 10 is a front elevation of the preferred form of stock indicator unit.

Figure 11 is a perspective of the stock indicator unit, shown in Figure 10, as viewed from the rear.

Figure 12 is a section of the stock indicator unit taken on line 12—12 in Figure 10.

Figure 13 is a perspective of the indicator drum with parts broken away.

Figure 14 is a cross section taken on line 14—14 in Figure 12.

Figure 15 is a detail of the indicator drum unlatching mechanism.

Figure 17 is a continuation of Figure 16.

Figure 18 is a perspective of a modified form of indicator of the electromagnetically operated type.

Figure 19 is a fragmental view of a modified form of indicator drum of the cross magnetic field type.

Figures 20 and 21 are schematic diagrams showing the field windings of two forms of cross magnetic field indicator drums shown in Figure 19.

Figures 22 and 23 are vector diagrams showing the directions of the resultant field in the cross magnetic field indicator drum shown in Figure 19.

Figure 24 represents a code used in connection with the cross magnetic field type of indicator drum shown in Figure 19.

Figure 25 is a diagram of the price selector together with the operating circuit therefor used in connection with the cross magnetic field type of indicator drum.

Figure 26 is a diagram of a modified form of price selector of the revertive type together with the operating circuit therefor.

Figure 27 is a perspective of a modified form of stock indicator unit of the pneumatic type, with certain parts broken away to show more clearly the details thereof.

Figure 28 is a fragmental plan showing the details of the indicator drum operating mechanism used in connection with the stock unit shown in Figure 27.

Figures 29 and 30 are longitudinal sectional views of the aggregate motion device employed in connection with the stock unit shown in Figure 27.

*Transmitting station*

In the stock quotation distribution system herein disclosed, there is indicated for purposes of illustration (see Figure 1) the transmission of the stock quotation initiated through the medium of a perforated tape. It is understood that any other medium, such as for instance, direct keyboard operation may be employed. Perforated tape 1 (Figure 4a) in the present embodiment of this invention has groups of perforations, the first three successive groups of cross perforations representing letter signals; the next group representing the nature of the stock, whether "common", or "first, second or third preferred"; the next group representing the index code; and the last three representing the numeral codes which constitute the price of the stock or commodity, representing the tens, units and fractions of the particular quotation.

Associated with the fractions' perforations there is perforated in every case, an additional hole 10, which is not perforated in any other position. If the tape is a five-hole cross-perforated type, this additional hole will be in the sixth line. This perforation does not control the transmission of a code combination signal as do the other perforations but does control the energization of a tape feed magnet, so as to locally insure message synchronism between the tape and the transmitting distributor brush, as will hereinafter appear. Any well known form of automatic telegraph transmitter may be used for this purpose such as is to be described for purposes of illustration in the following.

Figure 1:
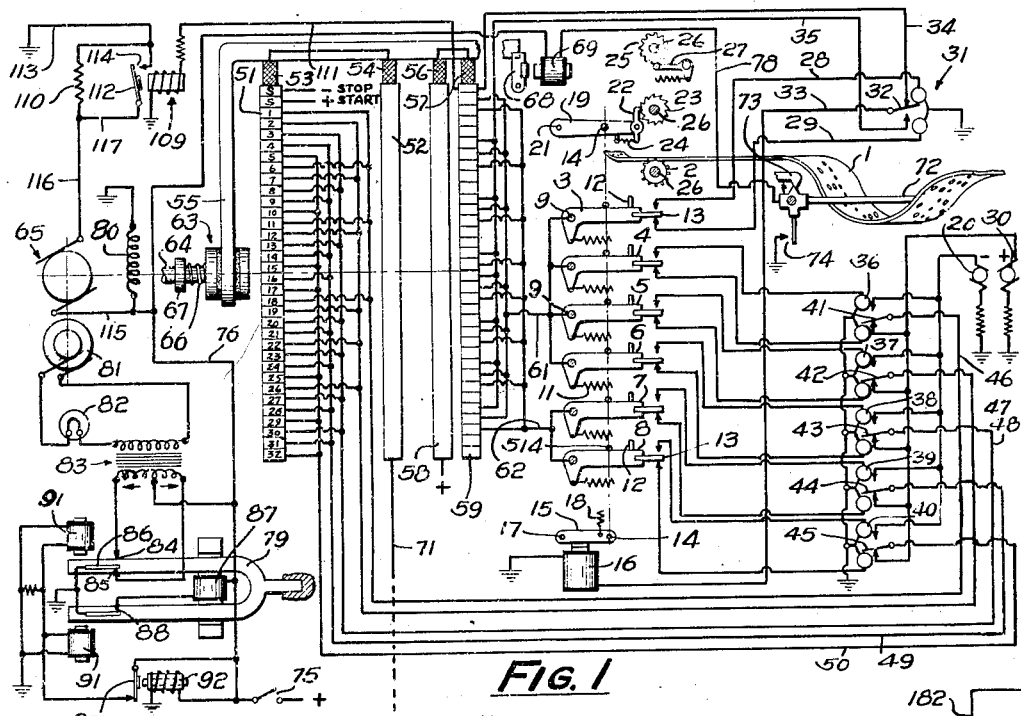
Figure 1 is a diagrammatic view of the circuits and apparatus for a transmitting distributing arrangement, embodying the invention, and having a single stop segment and a large number of code combination segments used in connection with a transmitter having a lesser number of transmitting contacts.

Tape 1 is fed to the automatic transmitter, Figure 1, by means of feed wheel 2, the pins of which engage the central row of feed perforations in the tape. Feed wheel 2 is rotated in a step-by-step manner to be described in detail hereinafter. In operative relation with the perforations positioned across tape 1 are six individual feeler levers 3 to 8 all pivotally mounted on rod 9 about which they are urged in a counter-clockwise direction by individual springs 11. Although the levers are shown diagrammatically as positioned beneath each other, it will be understood that this is merely for purpose of clarity and that in practice the levers are in a horizontal row on a common pivot 9 and in operative relation with the tape. Each feeler lever is provided with an integral feeler pin 12 which, when the associated lever is moved in a counter-clockwise direction about pivot 9, engages the surface of tape 1 or enters a perforation therein. Each of the levers 3 to 8 is also provided with a contact extension member 13 which is arranged to move between lower and upper contacts in accordance with movements of the feeler levers.

Extending across the top of levers 3 to 8 is resetting bail 14 which is operably connected to armature 15 of resetting electromagnet 16, which armature normally tends to rotate in a counter-clockwise sense about its pivot 17 due to spring 18. Bail 14 is also secured at one end to tape-feed lever 19 pivoted at 21. Pivoted to the free end of lever 19 is feed pawl 22 which is held into operative engagement with the teeth of ratchet wheel 23 by spring 24. Feed wheel 2, ratchet wheel 23, and detent wheel 25 are mounted on a common shaft 26. Detent wheel 25 is adapted to co-act with a jockey roller mounted on a spring actuated lever 27 to maintain the tape in set position.

Feeler levers 3 to 8 and tape feed lever 19 are adapted to be oscillated up and down periodically by the action of magnet 16 upon bail 14, as will presently appear. As bail 14 moves upwardly, lever 19 is rocked about its pivot 21 raising feed pawl 22 to engage the next tooth on ratchet wheel 23. During downward movement of bail 14 ratchet wheel 23 and, accordingly, feed wheel 2 are moved one step to present a succeeding row of perforations to feelers 12. It will be noted that this movement of the tape occurs after the feelers are out of engagement with the tape, rotation of the feed wheel 2 occurring during the downward movement of bail 14 after the feelers have moved out of engagement with the perforations presented thereto. This delayed feeding action prevents tearing of the perforations by feeler pins 12.

When bail 14 is again moved upward feelers 12 are permitted to move upwardly under the action of their individual springs 11. Those feeler pins 12 which are beneath a perforation in the tape will then continue to move into the perforation until the associated contactor 13 engages its upper contact. If no perforation is disposed above the feeler pin 12, the movement of said feeler pin will thus be limited and its associated contactor 13 will remain against the lower contact.

Contactor 13 of the first feeler lever 3 controls a circuit over conductors 28 and 29 to the upper and lower windings respectively of polar relay 31.

Polar relay 31 comprises an armature 32 which moves between its upper and lower contacts and extends a circuit from conductor 33 for the resetting magnet 16 over conductor 34 or conductor 35 to segments on the transmitting distributor, as will be described hereinafter.

Contactors 13 of the other feeler levers 3 to 6 extend circuits to the upper and lower windings respectively of storage relays 36 to 40, which, as will be described hereinafter, are energized in accordance with the cooperation of feelers 3 with perforations in tape 1 and operate their respective armatures 41 to 45. The upper and lower contacts of these armatures are multiplied and connected respectively to the negative and positive sides of current sources 20 and 30 and circuits therefrom, and over armatures 41 to 45 extend over conductors 46 to 50 respectively to the first to fifth code combination contacts on distribution ring 51. It will be noted that the same conductors are multipled to each succeeding group of five segments on the ring 51, being connected in successive order for the first three groups of five segments.

Ring 51 comprises first a stop segment which is permanently connected to negative polarity and second a start segment which is permanently connected to positive polarity. Ring 51 is bridged with a solid ring 52 by brushes 53 and 54 carried on distributor arm 55. Arm 55 in addition carries brushes 56 and 57 which bridge solid ring 58 and segmented ring 59. Solid ring 58, it will be noted, is connected to positive polarity, and the first segment on distributor ring 59 is connected over conductor 34 to the upper contact of armature 32 of relay 31.

The segments on ring 59 are in groups of five, the first three groups each comprising three contact segments followed by two blank segments. Second contact on segmented ring 59 is multipled with the second contact of the first three groups of five and extends over conductor 61 to the feeler levers 3 to 6. The third segment is multipled with the third segment of the first three groups of segments and extends over the conductor 62 to feeler levers 7 and 8. It will also be noted that the first segments of each of the groups of segments starting with the second group are multipled to each other and extend over conductor 35 to the lower contact of the armature 32, of relay 31.

Arm 55 is connected through friction clutch 63 to shaft 64 of motor 65. Spring 66 engaging shoulder 67 on shaft 64 forces friction clutch 63 into engagement with distributor arm 55.

Distributor arm 55 is normally held from rotation by armature 68 associated with start magnet 69 and in this position a stop-current is transmitted for the distant receiver or receivers from negative polarity over the first or stop segment of distributor ring 51, brushes 53 and 54, solid ring 52 and line wire 71 to the receiving relay of the distant receiving apparatus. There is also held closed at this time a circuit to energize resetting magnet 16 over the wire 33, armature 32, wire 34, brush 57, upper segment of ring 59, brush 56 and ring 58 to positive.

Start magnet 69 is controlled by tape control arm 72 which in turn is operated by slack in the tape. Tape arm 72 is shown in Figure 1 in its latched position, being so held by detent member 73, which position is assumed manually. When tape arm 72 assumes its unlatched position it tends to close contact 74 when the slackness of the tape is sufficient to permit, and when the tape becomes taut it tends to break contact 74 thus automatically arresting operation of the transmitter until the tape again becomes slack. However, it is intended that the tautness of the tape shall not throw the tape arm 72 sufficiently in counter-clockwise direction, Figure 1, to its latched position, which position, as previously stated, can only be assumed manually. When the arm 72 is in its unlatched position and the tape is slack, contact 74 is closed and an energizing circuit for start magnet 69 is completed (when manually operated main switch 75 is closed) from positive polarity through switch 75 over wires 76 and 77 through winding of magnet 69, over wire 78 through contact 74 to ground. Thus energization of magnet 69 tends to move the armature 68 from the path of the distributor arm 55. When the tape becomes taut contact 74 is opened and armature 68 of start magnet 69 moves into the path of the distributor arm 55.

Assuming the tape to be slack, magnet 69 is energized and armature 68 is operated to move out of the path of distributor arm 55. Brush 53 being at this time in engagement with the first segment on distributor 51, a stop impulse of negative polarity is impressed upon signalling line 71 as traced above.

Now, when brush 53 moves into engagement with the second or start segment, a positive or start impulse is impressed upon conductor 71 over the circuit traced above and receiving distributors connected to conductor 71 to be described more fully hereinafter are started into operation.

The last previous code combination on the tape, having embodied a sixth perforation 10, as previously mentioned, feeler 12 of feeler lever 3 moved to its upper position and upper winding of relay 31 was energized by way of the second segment on ring 59, shifting tongue 32 to the position shown in Figure 1 and preparing a circuit for magnet 16. Simultaneously with the brush 53 on the first segment, brush 57 is also on the first segment of the first group of segments on segmented ring 59 and a circuit is completed for resetting magnet 16 from positive polarity through distributor ring 58, over brushes 56 and 57, over conductor 34, through armature 32 which is now in its upper position, over conductor 33, through winding of magnet 16 to ground.

As a result of energization of magnet 16, bail 14 is pulled downwardly moving feeler levers 3 to 8 from the perforated tape and at the same time moving feeding lever 19 to feed the tape one step as previously described. As brushes 53 and 57 move to their related second segments, brush 57 breaks from the first segment of the first group of segments on ring 59, magnet 16 is de-energized and feeler levers 3 to 8 move into the code combination perforations with which they are at that time in operative relation. At the same time, brush 57 being on the second segment, current of positive polarity is impressed from the ring 58 through the second segment of ring 59, conductor 61, feeler levers 3 to 6, and, depending upon whether the contactors of feelers 4, 5 and 6 are in their upper or lower position, the polar relays 36 to 38 will be energized to in turn operate their armatures 41 to 43 to either their upper or lower contacts, respectively. The sixth feeler lever 3 will not find a hole at this time, and the armature 32 will move to its lower contact, thus connecting resetting magnet 16 for subsequent operation automatically after each group of perforations has been transmitted.

While brush 53 is on the first segment of ring 51, brush 57 is on the first segment of the first group of segments of ring 59. Thus while brush 53 is transmitting the stop signal from negative to line 71, brush 57 is charging magnet 16.

While brush 53 is moving over the second segment of ring 51, brush 57 is on the second segment of the first group of segments of ring 59. Brush 53 is then transmitting the start signal from positive battery to the line 71 and brush 57 is transferring the 1st, 2nd, 3rd, and 6th tape signals of the code combinations being transmitted from the tape to storing relays 36, 37, 38 and 31 respectively, the feelers having risen into the tape by release of magnet 16 in time to effect this function. This impresses signaling currents on the third, fourth and fifth segments of the ring 51 or segments 1, 2 and 3 of the first group in readiness for brush 53.

While brush 53 is moving over the third segment or segment 1 of ring 51, brush 57 is on the third segment of the first group of segments of ring 59. Brush 53 is transmitting the code signal either positive or negative from armature 41 over wire 46 to line 71 and brush 57 is transferring the fourth and fifth tape signals of the combination being transmitted from the tape to the storing relays 39 and 40, respectively, since the third segment of ring 59 is connected by wire 62 to feeler levers 7 and 8. This prepares the sixth and seventh segments, segments 4 and 5, of ring 51 in readiness for brush 53, since armatures 44 and 45 will now impress positive or negative currents on segments 4 and 5.

While brush 53 is moving over the fourth and fifth segments of ring 51, segments 2 and 3 transmitting the code signals from armatures 42 and 43 over wires 47 and 48 to the line 71, brush 57 is ineffective, since it is passing over a blank section of ring 59.

While brush 53 is moving over the sixth segment, segment 4 of ring 51, brush 57 is on the first segment of the second group of segments of ring 59. Brush 53 is transmitting the code signal from the armature 44 over the wire 49 to the line 71 and brush 57 completes an energizing circuit for magnet 16 to draw feelers 12 out of the tape and to step the tape forward to render effective the second code of perforations in the cycle. Magnet 16 is energized over wire 33, armature 32, lower contact and wire 35 to the first segment of the second group on the ring 59, it being remembered that armature 32 moved to its lower contact when contact 13 of feeler lever 3 engaged its lower contact. When brush 57 leaves the first segment of the second group, magnet 16 is de-energized and spring 18 retracts bar 14 so that all feeler levers rise to engage with another code combination of perforations. Since there is no sixth perforation for feeler lever 3 armature 32 of magnet 31 remains down.

While brush 53 is moving over the seventh segment, segment 5 of ring 51, brush 57 is on the second segment of the second group of segments of ring 59. Brush 53 is transmitting the code signal from the armature 45 over wire 50, to line 71 and brush 57 is transferring the first, second, and third tape-hole signals from the tape to the storing relays 36, 37, and 38 respectively, feelers 12 having risen into the tape by release of magnet 16. This prepares segments 6, 7 and 8 of ring 51 in readiness for brush 53.

While brush 53 is moving over segment 6 of ring 51, brush 57 is on the third segment of the second group of segments of ring 59. Brush 53 is transmitting the code signal from armature 41 over wire 46 to line 71, and brush 57 is transferring the fourth and fifth tape-hole signals as determined by feeler levers 7 and 8 from the tape to storing relays 39 and 40 respectively. This prepares segments 9 and 10 of ring 51 in readiness for brush 53.

The sequence will repeat for the third group of segments and brush 57 always will transfer the tape record to the storing relays and prepare any segment of ring 51 before brush 53 reaches the segment. It is noted that the first two segments marked S and the succeeding segments marked 1 to 15 on ring 51 control in turn the stop signal, the start signal, and then three groups of signals comprising five signals in each group. The last mentioned three groups of signals compose the letter code combination representing the commercial stock symbol of the stock quotation to be propagated.

Segments marked 16 and 17 on ring 51 control the signals composing the code combinations relating to the nature of the stock, such as common, preferred, class A or the like, which code combinations comprise two signals or impulses whose nature is governed by storing relays 39 and 40.

When brush 57 completes contact with the first fifteen segments on ring 59, thus completing the three selected code combinations, designating the stock, contact with the sixteenth segment on ring 59 operates the resetting magnet 16 to return the feeler levers 3 to 8 to initial position and to set the tape forward for the next group of perforations. When brush 57 engages the seventeenth segment on ring 59, storage relays 39 and 40 are operated in accordance with the setting of feeler levers 7 and 8, thus preparing segments 16 and 17 on ring 51 for engagement by brush 53. When brush 53 engages segments 16 and 17, positive or negative impulses are transmitted over the outgoing line 71 in accordance with the previous setting of storage magnets 39 and 40. These outgoing signals will actuate the receivers to indicate whether the stock to be quoted is common, preferred, class A or the like.

Segments 18 to 21 on ring 51 control the transmission of signals composing the code combinations to determine the range or index of the stock such as close, open, high, low, and last, which code combinations comprise four signals or impulses whose nature is governed by storage relays 36, 37, 38 and 39. When brush 57 engages the eighteenth segment of ring 59, resetting magnet 16 is operated to reset the feeler levers 3 to 8, and to step the tape forward for the code combination controlling the open, high, low or the like of the stock. Engagement of brush 57 with the nineteenth segment of ring 59 then operates storage relays 36, 37 and 38 in accordance with the setting of the feeler levers and engagement with the twentieth segment operates the relays 39 and 40.

Brush 53 successively engages segments 18, 19, 20 and 21 to transmit the settings of storage relays 36, 37, 38, 39 through the line 71.

The next two groups of segments marked 22 to 25, and 26 to 29 on ring 51, control the signals composing the code combinations relating to the tens and units' integers of the quotation, which code combinations comprise four signals or impulses whose nature is governed by the storing relays 37, 38, 39 and 40. The last group of segments marked 30, 31 and 32 control the signals constituting the code combinations pertaining to the fractions' numeral of the quotation, which code combinations comprise three signals or impulses whose nature is governed by the storing relays 38, 39 and 40. In each instance the segments on ring 51 are prepared for brush 53 by the previous setting of storing relays 36 to 40, brush 57 being always ahead of brush 53.

It will be recalled that associated with the fractions or last code combination to be transmitted, there is perforated in every case, a sixth hole, which is not perforated in any other position. Accordingly, when brush 57 moves over the first segment of the last group, magnet 16 energizes, feeding the tape to the next position; upon de-energization of magnet 16 and movement of feeler 12 of feeler lever 3 into the sixth perforation of the tape, a circuit is prepared for upper coil of relay 31. As brush 57 moves to the second contact or segment of the last group, current of positive polarity is impressed on conductor 61 which flows through feeler lever 3 to the upper winding of relay 31 and armature 32 will be moved to engage its upper contact as shown (Figure 1).

As will now be clear, the tape is moved one step as the brushes move from one to the succeeding group of segments. To insure message synchronism between the tape and the distributor brush, energization of magnet 16, upon which stepping of the tape and therefore operation depends, is made to respond, once for each message group of code combinations, to an impulse over a different circuit from that to which it responds at the remaining stepping positions in the message group.

In this arrangement it will be noted that if the tape becomes taut enough to move lever 72 and open the contact of the circuit for magnet 69, the code combinations will continue to be transmitted until brush arm 55 reaches the first position shown whereat it will be engaged by the armature 68. Furthermore, in the event that the tape is placed in the transmitter in the wrong position and the distributor is operated, it will step along until it comes to a position having the sixth perforation whereupon it will fail to step until the distributor reaches the position shown in Figure 1 and will be automatically brought to the correct position with reference to the distributor regardless of how it may have originally been placed in the transmitter. It also will be noted that the signals are stored in two groups, the transfer taking place at different times for the two groups so that an overlap is provided which allows time for the stepping of the tape although the successive segments corresponding to the last pulse of one single code combination and to the first pulse of the succeeding single code combination have no extra segments between them; that is, the tape may be operated to the next position during the period while the preceding stored code combination is still being transmitted and may thus be conditioned for the next code combination during this interval.

The speed of motor 65 is governed by a vibrating fork 79 operating as follows: Motor 65 is provided with field winding 80 connected to wire 76 and having its opposite end grounded. Upon the same shaft with the armature of motor 65 is an alternating current motor 81 connected through lamp 82 to the secondary of transformer 83. The primary of this transformer is connected to contacts 84 and 85 adapted to be engaged by spring 86 mounted on one tine of tuning fork 79, said spring being connected to ground as shown.

Magnet 87 is provided for vibrating fork 79 and is periodically connected in a closed circuit by contact spring 88 on the opposite tine of the tuning fork. When the tines of the fork are spread apart, contactor 86 engages contact 84, whereby current can pass from positive over closed switch 75 to the center of the secondary of transformer 83 and to ground. The circuit for magnet 87 is thus broken and the tines of the fork will return to their closed position, and spring 86 engages contact 85 and current flows in the opposite direction in the secondary of transformer 83. In this manner periodical reversals of current are produced in the primary of transformer 83, and this current induces alternating currents of predetermined frequency in the primary of the transformer which flows through the alternating current motor 81.

As is well known, the tines of fork 79 may be made to vibrate at a predetermined frequency and are then kept vibrating at this frequency by the magnet 87. Accordingly current of a fixed frequency flows through the winding of motor 81 to produce rotation in a well known manner at a speed determined by the frequency of the current flowing therethrough. In this manner the motor 65 is kept rotating at a constant speed, the actual power for driving the shaft upon which the motor is mounted being supplied by the direct current winding of said motor. By this connection an almost constant rotating speed for the distributor is obtained. The flickering of lamp 82 may be observed, and will indicate that the speed at which the motor is rotating is not correct.

In order to start the vibrating fork in motion, two starting magnets 91 are provided, connected in parallel to a circuit which serially includes a magnet 92 having an armature 93.

From an inspection of the circuit, it will be apparent that when switch 75 is closed a current may pass through closed contact of armature 93 to the starting magnets 91 and to ground. The tines of fork 79 will thus be pulled apart to start the same in vibration and initiate the operation of the control. Current also passes through electro-magnet 92 to move armature 93, thus at once breaking the starting circuit so that the magnet 87 may continue vibrations of the fork.

Associated with the distributor motor 65, Figure 1, is a load compensating means comprising a relay 109 and resistance 110, which will now be described. It is understood that when the transmitting distributor is at rest, switches 74 and 75 are open, the motor 65 is not running, and brush arm 55 is stopped by armature 68.

Assuming that switch 75 is closed in order to initiate operation of the transmitting distributor, an energizing circuit for magnet 16 is completed from positive, ring 58, brushes 56 and 57, first segment on ring 59, over wire 34, armature 32, wire 33, through winding of magnet 16 to negative ground. Magnet 109 is energized from positive, ring 58, brushes 56 and 57, first segment of ring 59, wire 111, winding of relay 109 to ground. Energization of relay 109 causes armature 112 to be pulled up to close contact 114. simultaneously with the energization of relay 109 a power circuit for motor 65 is completed from positive through switch 75 over wires 76 and 115, through motor 65, over wires 116 and 117, over armature 112, through contact 114, over wire 113 to ground. Motor 65 is at this time tending to rotate distributor arm 55 against the resistance of friction clutch 63, which is thus imposing a load on the motor, since arm 55 is restrained from rotation by armature 68.

Now, when arm 55 is released for rotation, which, is initiated, as previously described, when contact 74 associated with tape arm 72 is closed thus causing energization of start magnet 69 to actuate armature 68, the load on the motor imposed by the friction clutch will be suddenly lessened and the motor would at once tend to speed up suddenly, carrying brushes 53 and 57 across the initial segments too quickly. To prevent this occurrence, there is provided the above mentioned compensating means, which consists essentially in inserting a resistance adjusted to compensate for the difference of load in the motor circuit substantially simultaneously with the release of brush arm 55, in the following manner.

When contact 74 is closed magnet 69 becomes energized and rotation of brush arm 55 is initiated. As soon as brush 57 moves off the first segment of ring 59, relay 109 becomes de-energized, thus releasing armature 112 and breaking the circuit through contact 114. The motor current thus will be compelled to flow through the resistance 110 to ground, reducing the motor current, thereby compensating for the load imposed by the friction clutch, which load is removed when the arm 55 is released for movement.

Initiation of transmission may be accomplished by manually moving arm 72 against tension of detent 73 whereby contact 74 is closed. This will operate the start magnet 69 to allow rotation of the distributor arm 55 in the manner hereinbefore described. If at any time during transmission the tape become sufficiently taut, arm 72 will be raised to open contact 74 and the distributor will be stopped at the completion of the group of signals being transmitted, or when distributor arm 55 arrives at the position shown in Figure 1. This movement of arm 72 by the tape, however, is not sufficient to overcome the detent 73 so that when the tape again becomes slack contact 74 is at once closed and the transmission of signals is resumed. If it is desired to suspend operation, arm 72 may be manually lifted to the position shown in Figure 1 whereby detent 73 will maintain contact 74 open.

*Receiving station*

Figure 2:
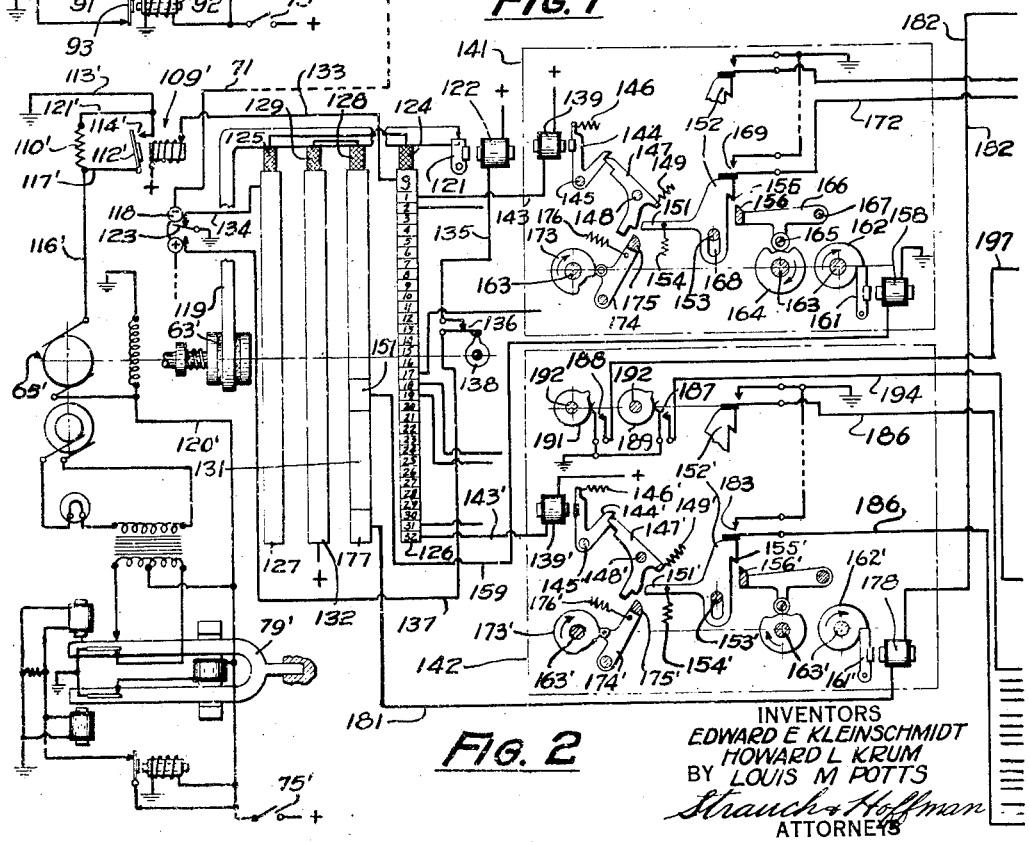
Figure 2 is a diagrammatic view of the circuits and apparatus for a receiving distributing arrangement having a single start segment and a large number of code combination segments used in connection with the overlap units, adapted to operate with the transmitter of Figure 1.

Referring to Figure 2, Sheet 1, the signals, which are of both positive and negative polarity, are received from the transmitting station over line wire 71 and pass through receiving relay 118, which is of the polar type of any well known construction, thence either to ground or to one or more receiving stations. The speed of rotation of motor 65' and consequently of brush arm 119 of the receiving distributor is controlled by a vibrating fork 79' as in the case of the transmitting distributor, shown in Figure 1, to which reference may be had for a full understanding of like equipment for which the description is not repeated in detail.

When switch 75' is closed, a power circuit for motor 65' is completed from positive through switch 75', over wire 120, through winding of motor 65', over wire 116', thence either through resistance 110', and over wire 121 to ground, or over wire 117', through armature 112', contact 114' over conductor 113' to ground, as will presently appear. The motor thus tends to rotate distributor arm 119 against the resistance of friction clutch 63', thus imposing a load on the motor due to the pressure exerted by the friction clutch combined with the fact that arm 119 is restrained from rotation by armature 121 associated with start magnet 122. As previously set forth, when the transmitting apparatus, shown in Figure 1, is in its stop position, line 71 is normally charged with marking or negative current. Armature 123 of polar relay 118, Figure 2, thus is caused to engage the upper contact as shown.

Carried on distributor arm 119 are brushes 124 and 125, which are electrically connected and are adapted to bridge rings 126 and 127 of the receiving distributor. Also carried on arm 119 are brushes 128 and 129 electrically connected and adapted to bridge rings 131 and 132. As previously described in connection with the transmitting distributor, when brush arm 119 is released for rotation, as will presently appear, it will tend to rotate with an initial sudden increase of speed due to the instantaneous decrease of the load or resistance imposed by the friction clutch. To prevent this occurrence, there is also provided a load compensating means similar in character and effect to that previously described. Thus when brush arm 119 is in its stop position and armature 123 of polar relay engages the upper contact, an energizing circuit for relay 109' is completed from positive battery through the winding of relay 109', over wire 133, through the first segment of ring 126, through brushes 124 and 125, over segment 127, wire 134 through said upper contact and polar relay armature 123 to ground.

When the receiving apparatus is in this condition armature 112' is pulled up and a path through contact 114' is closed to complete one of the previously mentioned alternate power circuits for motor 65'. Now, when arm 119 is released for rotation by the reception of a start impulse, as will presently appear, relay 109' will become de-energized when polar relay armature 123 engages the lower contact, thus breaking the circuit through the upper contact. Armature 112' then will become released and resistance 110' will be inserted in the power circuit for motor 65', thereby compensating for the load just removed from friction clutch 63'.

To initiate rotation of distributor arm 119, Figure 2, a starting impulse of positive polarity is impressed on line 71, as hereinbefore described, which energizes polar relay 118 causing its associated armature 123 to move to the lower contact thus completing an energizing circuit for start magnet 122 from positive battery, through winding of magnet 122, over wire 135, through cam operated contact 136, over wire 137, lower contact of polar relay 118, over associated armature 123 to ground. Energization of magnet 122 pulls up its armature 121 to release brush arm 119 for rotation.

Mounted on distributor shaft and rotatable therewith is contact operating cam 138 adapted to close contact 136 only when brush arm 119 is in its upper or stop position. Thus it is clear that start magnet 122 can become energized only once in every revolution of the distributor and at a fixed point in the revolution.

Signal impulses as they are received over line 71 and through polar relay 118 cause the armature 123 of the relay to vibrate in accordance therewith, and whenever a marking impulse is received as brush 124 wipes over segments 1 to 32 of ring 126 circuits are completed to effect energization of one of the seventeen selector magnets 139 or one of the fifteen magnets 139' in the overlap units 141 and 142 respectively in the following manner.

If the first impulse after the start impulse is of negative or marking nature an energizing circuit for selector magnet 139 in overlap unit 141 is completed from positive battery through winding of selector magnet 139, over wire 143, through segment marked 1 on ring 126, through brushes 124 and 125, (which are now cooperating with segment marked 1) ring 127, over wire 134 and armature 123 to ground.

The other selector magnets 139 and 139' in the overlap units 141 and 142 are similarly successively affected, as brush arm 119 makes one revolution if marking impulses are received; but when spacing impulses are received the energizing circuits for magnets 139 and 139', previously described, are broken at the upper contact of polar relay armature 123 and consequently no selection is made in the overlap unit.

Briefly, the overlap units 141 and 142 each comprise means for storing the received stock quotation to provide a complete overlap of one message, so that a second message can be received simultaneously with the propagation of the previously received message to the stock quotation board. Essentially, selector magnets 139 and 139' are energized in accordance with the received code combinations and effect through mechanical means the closing of associated storing contacts, as will now be described.

It is to be noted that segments 1 to 17 on ring 126 are each electrically connected to associated selector magnets 139 in overlap unit 141 over conductors such as 143. Likewise, segments 18 to 32 are electrically connected to associated selector magnets 139' in overlap unit 142. That part of the complete stock quotation message which pertains to the name of the stock and its nature (as "common" or "preferred") is stored up in overlap unit 141; and that part pertaining to the price and index of the stock is stored up in overlap unit 142.

Having reference to Figure 2, we have seen how energization of selector magnets 139 are effected. When any selector magnet 139 or 139' is energized it attracts its armature which is secured to one arm of latch member 144 or 144' individual thereto and causes latch 144 or 144' to rotate slightly in a counter-clockwise direction about its pivot 145 or 145' against the action of retractile spring 146 or 146'. This movement of each latch 144 or 144' permits its associated selector lever 147 or 147' to become unlatched therefrom, thereby allowing the associated lever 147 or 147' to rotate in a counter-clockwise direction about its pivot 148 or 148' due to the action of tension spring 149 or 149' individual thereto.

Each selector lever 147 and 147' is provided with an arm adapted to co-act with arm 151 or 151' of contact lever 152 or 152' associated therewith, so that when a lever 147 or 147' is actuated, as previously described, associated contact lever 152 or 152' is caused to rotate in a clockwise sense about its pivot 153 or 153' against the action of retractile spring 154 or 154', until its undercut notch 155 or 155' is disposed above associated contact bail blade 156 or 156'. Notch 155 or 155' is adapted to receive contact bail blade 156 or 156' when the latter is actuated, as will presently appear. Also, contact bail blade 156 or 156' is adapted to span all of the seventeen contact levers 152 or 152'.

Selector magnets 139 of overlap unit 141 are the first in a complete cycle to become energized and immediately after brush 124 has traversed the seventeen segments controlling magnets 139 in unit 141, brush 128 wipes over segment 157 on ring 131 thus completing an energizing circuit for start magnet 158 in overlap unit 141 from positive battery through distributor ring 132, brushes 129 and 128, segment 157, over wire 159, through winding of magnet 158 to ground.

Energization of magnet 158 tends to pull its associated armature 161 out of engagement with stop cam 162 secured to drive shaft 163 to initiate rotation of said shaft, which is operably connected to a motor or other driving means (not shown). Secured to shaft 163 is the contact bail operating cam 164, which is adapted to coact with a follower 165 on lever 166, to which lever bail blade 156 is secured. Clockwise rotation is imparted by cam 164 to lever 166 about its pivot 167 to elevate bail blade 156. Blade 156 in its upward movement is adapted to engage the undercut notches 155 of those selectively operated contact levers 152, to carry said contact levers upwardly, which movement is permitted by slotted hole 168. This vertical movement causes the closing of associated storing contacts 169 to effect energization of individual selector magnets such as 170 in the stock selecting unit 171, Figure 3, from positive battery, common conductor 180, through winding of individual magnets such as 170, over wires such as 172, through contact such as 169 (Figure 2) to ground. The effect of the energization of individual selector magnets 170 will be described hereinafter.

Also secured to driving shaft 163 is reset bail cam 173 adapted to co-act with follower on reset bail lever 174, to the end of which is secured reset bail 175 fashioned to span all the individual selector levers 147. After a predetermined interval in the rotation of cam 173, lever 174 is released for counter-clockwise motion under the tension of spring 176. This counter-clockwise motion of reset bail lever 174 imparts through reset bail 175 clockwise rotation to all of the previously selected selector levers 147 so that said selector levers will again become latched by detent levers 144. After having reset the selected selector levers 147, reset bail 175 is again returned to its initial position by cam 173, cam 164 returns to its initial position releasing contact levers 152 which return to initial positions, and latch 161 stops shaft 163 in the position of Figure 2 ready for a subsequent operation.

As brush 124 traverses the segments 18 to 32 on ring 126 the energization of selector magnets 139' in overlap unit 142 is selectively determined to effect the setting of their associated contact levers 152'. When the brush 124 passes over the last two or three of this last mentioned series of segments, brush 128 is in contactual relation with segment 177 of ring 131 to complete an energizing circuit for start magnets 178 and 179 in overlap unit 142 and stock selector 171, respectively, from positive battery, through ring 132, brushes 129 and 128, segment 177, over wire 181, through winding of magnet 178, over wire 182, through winding of magnet 179 (Figure 3) to ground. Energization of magnet 178 attracts armature 161' releasing shaft 163' similar to shaft 163, for rotation to close the selected ones of storing contacts 183' through operation of bail 156', and to thereafter restore released latches 144' under influence of cam 173' and bail 175' before shaft 163' comes to rest by engagement of the shoulder of cam 162' with the end of armature 161' in the manner above set forth in connection with the operation of parts 156 to 175.

Figure 3:
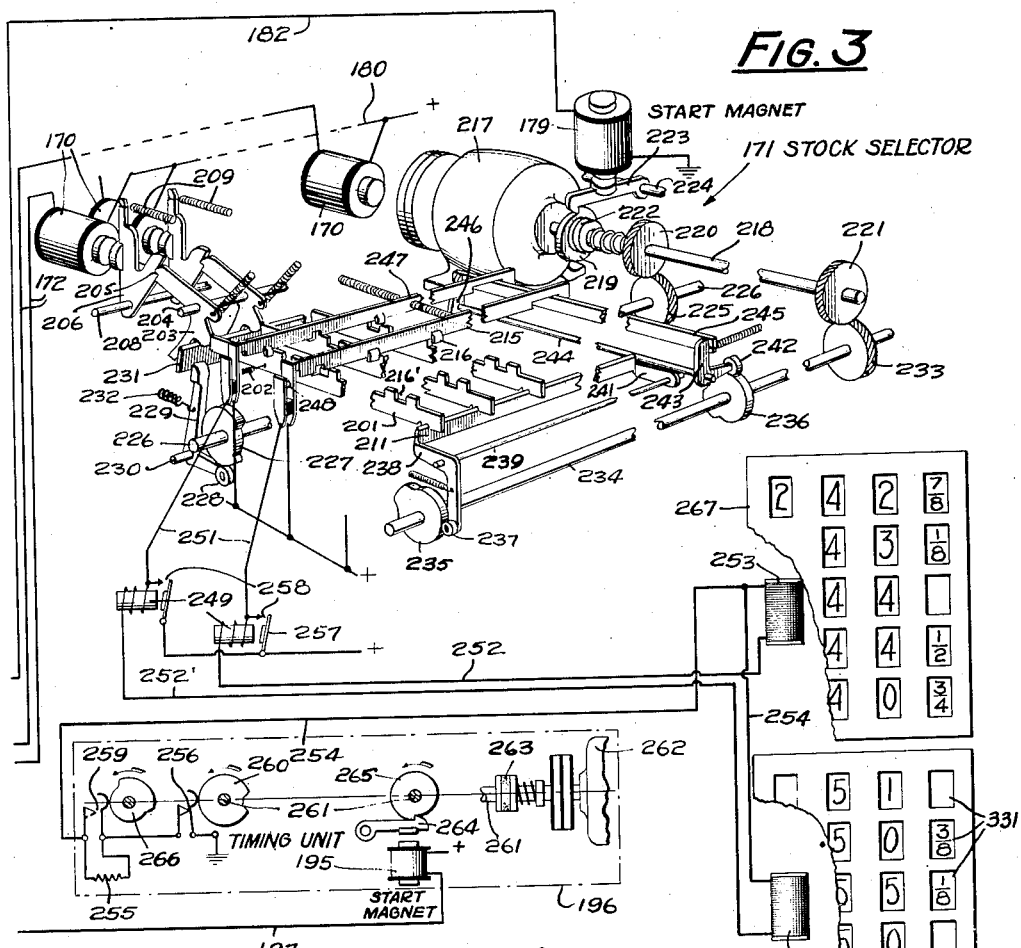
Figure 3 is a continuation of Figure 2 and represents in a composite view the stock selector, timing unit, and two stock indicator units together with the operating circuit therefor.

The effect of energizing start magnet 179 will presently appear when the stock selecting unit 171, Figure 3 is described. The overlap unit 141 is operated before unit 142 for the reason that the energization of stock selector magnets 170 must have been selectively determined before the initiation of operation of stock selector unit 171. It is noted that the mechanical operations of overlap unit 142 and stock selector 171 are initiated simultaneously.

The effect of energizing start magnet 179 is similar to that following the energization of magnet 158 in overlap unit 141 and hereinbefore described. However, the closing of individual storing contacts 183 complete energizing circuits for individual selector magnets 184 in price selecting unit 185, Figure 4, from positive battery through winding of selector magnets 184, over wire 186, through contacts 183 to ground. The effect of energizing individual selector magnets 184 in the price and index selecting unit 185 to selectively determine the price to be exhibited on the stock quotation board will appear subsequently when unit 185 is described.

Mounted in overlap unit 142 are timing contacts 187 and 188 which are operated by cams 189 and 191, respectively, which cams are securely mounted on shaft 192 in turn operably connected in any suitable manner to main driving shaft 163'. Contact 187 is electrically connected to start magnet 193 in unit 185 (Figure 4) and is adapted when closed to complete an energizing circuit for said magnet from positive battery through winding magnet 193 over wire 194, through contact 187 to ground. The effect of the energization of start magnet 193 is to initiate the mechanical operation of the price selecting unit 185 as will hereinafter appear.

Contact 188 is electrically connected to the start magnet 195 in the timing unit 196, Figure 3, and is adapted when closed to complete an energizing circuit for said magnet from positive battery through winding of magnet 195, over wire 197, through contact 188 to ground. The effect of the energization of the start magnet 195 is to initiate operation of timing unit 196 as will become apparent hereinafter.

The cam 189 for contacts 187 is so timed that these contacts are closed immediately after selected contacts 183 have been closed by bail 156', to thus operate start magnet 193 immediately after the magnets 184 have moved levers 295 to their new positions. Cam 191 simultaneously closes contacts 188 to operate start magnet 195 of timing unit 196 at this time.

*Stock selector*

The stock selecting unit 171, Figure 3, comprises a frame (not shown) in which are mounted a series of slidable permutation letter code bars 201. In the present instance, there are seventeen such bars 201, one individual to each unit of the three five-unit code combinations utilized to select the stocks the designation for which is composed of three letters, and two "preferred" stock letter bars, one bar 201 being controlled by each magnet 139 and its contact 169 as will more fully hereinafter appear. Letter code or selector bars 201 are under tension to the left (as viewed in Figure 3) by individual springs 202, each secured to its associated bar and to the framework. At one end of each letter bar 201 is a spring-pressed selector lever 203 pivoted on common shaft 204 and normally held in an unoperated position by engagement with a notch 205 in latch member 206, similar to the latch 144 in the overlap unit, and which is urged counter-clockwise about its pivot by spring 207. Latches 206 pivoted on common shaft 208 are urged in a clockwise direction by the springs 209. When one lever 203 is held by its detent 206 in its unoperated position, its letter bar 201 is allowed to move to its left hand position under the tension of spring 202 (left being toward the magnets 170). However, there is a slight amount of lost motion between selector levers 203 and letter bars 201 sufficient to permit end of selector lever 203 to be tripped off or become disengaged from the notch 205 of latch 206, permitting a very slight counter-clockwise rotation of lever 203, thus rendering effective the action of spring 207 when selected letter bar 201 is permitted to move by reason of the disengagement of locking blade 211 therefrom.

Incidentally, springs 207 are stronger than springs 202 associated with letter bars 201, because in moving the permutation bar to the right, spring 207 must overcome the action of spring 202. The sole purpose of springs 202 is to return the associated selector letter bar 201 to its left hand position after it is released by locking blade 211.

When a selector magnet 170 is energized, in the previously described manner, it attracts its armature which is secured to one arm of latch 206 and causes said latch to rotate slightly counter-clockwise (as viewed in Figure 3) about pivot 208 against action of its retractile spring 209. This movement of latch 206 permits its associated selector lever 203 to become unlatched therefrom, thereby allowing lever 203 to rotate counter-clockwise about pivot 204 due to the action of its associated spring 207, thus permitting tension of spring 207 to be transferred to associated bar 201. This has no effect at this time, however, as each bar 201 is locked by blade 211, the operation of which will be described hereinafter.

Located above permutation bars 201 and transversely thereof is a series of slidable stock bars 215. Stock bars 215 each have projections 216, and the letter bars have slots 216' co-acting selectively therewith. Slots 216' and projections 216 in both cases are preferably equally spaced on the bars. Each different stock bar has its projection 216 bent in a different arrangement of right and left hand positions, according to the permutations or letter code signals allotted to cause selection of that stock bar. The lugs are bent to the right for operated letter bars and to the left for unoperated letter bars in such manner that if the letter bars 201 are set in accordance with the three letter permutations or combinations allotted to a given stock bar, the stock bar corresponding to this combination of letter signals and having its projections 216 bent in a corresponding manner will have each of its projections 216 aligned with a slot 216' in the letter or selector bars and be permitted to operate selectively as described later.

Power for operating the stock selecting unit is supplied by a governed motor 217. Mounted on shaft 218, which is rotatably connected to the motor shaft, are stop disc 219 and gears 220 and 221. Disc 219 is rotatably connected to shaft 218 by spring pressed friction clutch 222 and is adapted to co-act with armature latch member 223 pivoted at 224. Gear 220 is adapted to mesh with corresponding gear 225 fixed to transversely disposed shaft 226. Rotatably fixed to shaft 226 is a bail operating cam 227, which is adapted to co-act with follower 228 carried on bell-crank lever 229 pivoted at 230 to which lever one end of reset-bail blade 231 is secured, the other end being likewise secured to a lever arm (not shown) pivoted on shaft 230. Reset bail blade 231 is adapted to span all individual selector levers 203. During a predetermined interval in the rotation of cam 227, lever 229 is released for counter-clockwise rotation being so urged by tension spring 232. This counter-clockwise motion of reset bail lever 229 imparts through reset bail blade 231 clockwise rotation to all of the previously selected selector levers 203 so that said selector levers will again become latched at 205 by latches 206. Having reset selected levers 203, reset bail 231 is again returned to its clockwise position by cam 227.

Gear 221 is adapted to mesh with corresponding gear 233 fixed to transversely disposed shaft 234. Rotatably fixed to shaft 234 are cams 235 and 236. Cam 235 is fashioned to co-act with a follower 237 carried on a bell-crank lever 238 pivoted on shaft 239 to which lever one end of locking blade 211, previously alluded to, is secured; the other end being likewise secured to lever arm 241 also pivoted on shaft 239. Blade 211 is adapted to span all of the letter bars 201 and to cooperate with a pair of V-shaped notches in each letter bar, as will presently appear.

Cam 236 is adapted to cooperate with a follower 242 carried on bell-crank lever 243 pivoted on shaft 244 to which lever one end of stock bar bail blade 245 is secured, the other end being likewise secured to lever arm 246 also pivoted on shaft 244. Blade 245 is adapted to span all of the stock bars 215 each of which is notched to have cooperative relation therewith.

The operation of the stock selector will now be described. It is understood that a stock selecting unit as shown will have stock bars 215 corresponding to only a fraction of the total possible number of permutations of seventeen elements. In any particular case, any number of these stock selecting units may be used in parallel and while all the units will operate for each signal only one stock bar 215 will be selected in some one of the units by each different setting or permutation of bars 201. If a signal is received corresponding to a stock not represented on a particular board, no stock bar will be operated for that board. It will also be noted that by removing any one of the selector bars 215, another having a different combination of bent lugs 216, may be substituted thereby changing the stock selected in that particular position.

After the selected selector magnets 170 have become energized simultaneously by closing of contacts 169 by bail 156 in accordance with the received code combinations to effect the selection of the corresponding letter bars 201, the start magnet 179 has become energized after the completion of the price selection to attract its armature 223 to effect the unlatching of said armature from disc 219 to initiate rotation of shaft 218, and shafts 226 and 234. The first event thereafter is the oscillation of locking bar 211 by cam 235 through bell crank 238 to permit the resetting of letter bars 201 in accordance with the new combination. After letter bars 201 have again become locked in their new position by return of bar 211 to its upper position, when bell crank 238 leaves high portion of cam 235 reset bail 231 is oscillated to effect the resetting or relatching of selector levers 203, as previously described. Thence bail 245 is oscillated by cam 236 through bell crank 243 to permit the selected stock bars 215 to move to the front or to the left (as viewed in Figure 3) under the action of its individual spring 247 to momentarily close their associated contacts 248 to complete energizing circuits for self-locking relay 249 from positive battery through contacts 248, over wires 251, through windings of relay 249, over wire 252, through winding of selected register solenoid 253, over common return wire 254, through resistance 255, contact 256, to ground. Relays 249 close their contacts 258 and complete their own locking circuits from positive battery over armature 257, though contact 258 and winding of relay 249, thence over wire 252 and the preceding traced circuit to ground. Bail 245 returns to normal position when cam 236 rotates until a low portion is beneath bell crank 243, thus returning the selected stock bar to initial position and restoring the stock selector for the next selection.

Although current passes through selected solenoid 253 it is not affected at this time because it is marginal and does not operate until resistance 255 is shunted out by closing of contact 259 in timing unit 196, as will presently appear.

Timing unit 196 comprises essentially a plurality of contacts, in this instance contacts 256 and 259, adapted to be operated by suitable cams fixed to drive shaft 261, power to which is supplied by a governed motor 262 through friction (or any suitable) clutch 263. Shaft 261 is normally restrained from rotation by the action of armature latch 264, associated with start magnet 195, upon stop disc 265.

When start magnet 195 is energized as previously described, immediately after magnets 184 of price selector and magnets 170 of stock selector have been actuated, it attracts armature 264 to initiate rotation of shaft 261. At a predetermined time cam 266 closes contact 259 which shunts out resistance 255 and as a result thereof sufficient current is supplied to solenoid 253 to cause it to operate. The effect of the operation of solenoid 253 will become apparent hereinafter.

Further rotation of shaft 261 allows contacts 256 to open when cam 260 rotates to the point when the low portion thereof engages these contacts. Opening of contacts 256 de-energizes the selected stock magnet 253, but this occurs after the price selector has operated as hereinafter explained.

The face view of the stock unit is shown diagrammatically at 267 and 267' which views are broken away to show the location and position of the solenoid individual thereto. Incidentally wire 254 is common to one terminal of all individual solenoids such as 253 and 253'.

A detailed description of stock unit 267 will be given hereinafter, so it will be sufficient to say here that each stock unit comprises essentially a front mask provided with a plurality of rows of rectangular apertures through which are displayed the figures pertaining to the various price indexes of the individual stock. The stock unit or register is controlled by price selecting means 185, preferably mechanical, to set the figures.

*Price selector*

The price selecting unit 185, Figure 4, comprises essentially a plurality of code disc selecting mechanisms 268, 269, 270 and 271, which are adapted to be mounted at the foot of each column of stock units such as 267 (see Figure 9) and which operate in accordance with the quotation codes received to determine the angular rotation of the selected indicator drums in this column, as will hereinafter appear:

The price selecting unit comprises motor 273, Figure 9, carrying on its shaft 274 a worm gear 275 in meshing engagement with one of a plurality of gears 278 which is carried on and rotates a cross shaft 277. Cross shaft 277 also carries an individual gear 276 for each of four short vertical shafts 278, Figure 4. Each gear 276 meshes with a gear 279 mounted on the corresponding vertical shaft 278 and adapted to drive it through a friction clutch 281, of construction similar to clutch 63 previously described.

Referring to Figure 5, showing one code disc selector mechanism in detail, it is noted that concentric with short shaft 278 is a series of four loosely mounted, spaced, notched code discs 305 carried between guide plates 283 and 284, and separated by annular discs 285 carried on a shaft engaging thimble 286. In the case of the "fractions" code disc selector only three of the code discs 282 are operative, the fourth remaining idle, due to the smaller number of variant code combinations required for the fractions indication of the stock quotation, the idle disc being supplied to make the selector parts standard and interchangeable. Each disc 305 is adapted to occupy one or the other of two positions to which it is moved by means of individual transfer levers 287, Figure 4, and Figure 7. Each group of four (or three in the "fractions" selector) transfer levers 287 is pivotally mounted on a common stud at the end of one arm of an individual bell crank lever 289, the other arm of each bell crank lever 289 being pivotally connected to a common link 290. Levers 289 are caused to oscillate due to the action of cam 291 upon link 290 to effect shifting of code discs 305. As is noted, when start magnet 193 is energized at the proper time, as hereinbefore described, it attracts its armature 292 to effect release of stop disc 293 which is operably connected to cam 291 and which is also rotatably connected to shaft 294 by suitable friction clutch means (not shown). Constant rotative motion is imparted to shaft 294 by the motor 273 by a train of gears (not shown). Thus when disc 293 and hence cam 291 are released for rotation, link 290 is cammed to the right (as viewed in Figure 4) against the action of retractile spring 290', which movement of link 290 imparts to bell crank levers 289 a clockwise motion, which in turn imparts a downward movement to transfer levers 287.

Figure 4:
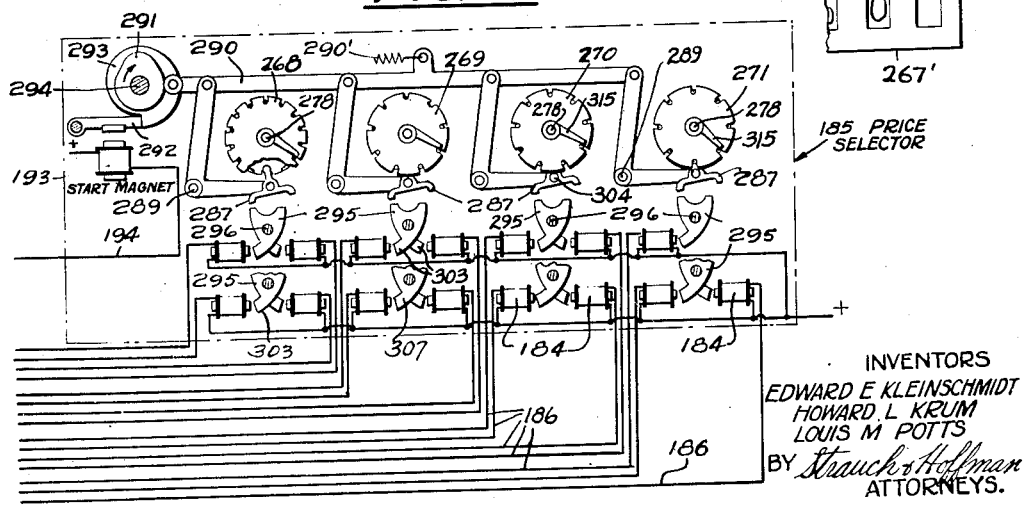
Figure 4 is also a continuation of Figure 2 and represents a diagrammatic view of the price selecting unit together with the operating circuit therefor.

Appropriately positioned to co-act with transfer levers 287 are individual selector levers 295, Figure 4, and Figure 7, arranged in three groups of four levers each and one group of three levers, for the fractions selector 271 as shown, which are pivotally mounted on common pivots 296. Selector levers 295 are provided with abutments 297 and 298, Figure 7, adapted to cooperate with arms 301 and 302 of transfer levers 287. Integral with selector lever 295 and oppositely disposed to abutments 301 and 302 is armature 303, which is adapted to be attracted by its associated selector magnet 184.

Transfer levers 287 are adapted to go through two different movements, first a reciprocating movement in which the lever 287 is reciprocated bodily due to the oscillation of bell crank lever 289 as will presently appear; and second a rocking movement about its pivot 304.

Assuming that one selector magnet 184 (Figure 7) is energized, its associated selector lever 295 is caused to rotate in a counter-clockwise sense (as viewed in Figure 7) thus presenting its abutment 297 into cooperative relation with arm 301 of its associated transfer lever 287.

Abutments 297 and 298 on the selector levers 295 (Figure 7) are spaced closer together than the ends of the arms 301 and 302, so that as the selector lever 295 takes one position or the other in response to energization and de-energization of selector magnets 184 due to the received electrical conditions, abutments 297 and arm 301 are in blocking engagement when the transfer lever 287 is bodily oscillated, and at the same time the arm 302 moves freely past the abutment 298 and alternately, the abutment 298 may move into blocking engagement with its related arm 302, while the arm 301 moves freely past the abutment 297.

Due to the engagement of abutment 297 and arm 301 a clockwise rotation is imparted to transfer lever 287 about its pivot 304 as lever 287 is bodily oscillated by bell crank 289; and reversely, when the abutment 298 and 302 engage, a counter-clockwise rotation is imparted to transfer lever 287, as the latter is bodily oscillated.

This clockwise rotation of transfer lever 287 thus urges its associated disc 305, through arm 306, to its counter-clockwise position. Conversely, de-energization of a selector magnet 184 will in a similar manner cause rotation of its associated code disc 305 to its clockwise position. When the selector magnets 184 are de-energized, selector levers 295 associated therewith are held in the unoperated position by the tension of springs 307, each of which springs, in the present embodiment, is common to a pair of selector levers.

Arranged circumferentially around notched code discs 305 is a series of spring pressed rods 308 (Figures 5, 6, and 7) carried in notches in guide plates 283 and 284, previously mentioned. A third guide plate 309 is maintained in spaced relation to plate 283 by a sleeve member 312 and tie bolts 313.

Rods 308 each carry a set of rollers 314 arranged opposite notches in the code discs 305. The notches in the discs are so arranged that for every combination of settings of the discs, a notch in each of the discs is in alignment with the notches in all other discs and the particular rod 308 which is opposite these aligned notches, will drop therein due to pressure of coiled springs 311, encircling all rods 308.

These notches are substantially of V-shape so that when the discs are re-operated in accordance with a new code combination of impulses, the particular rod which has previously dropped into the notches is cammed out and held on the outer circumferential edge of the discs. As a result of the new alignment of the discs, rod 308 opposite the newly aligned notches drops therein.

Carried on each short shaft 278 of each selector mechanism, and rotatable therewith, and adapted to cooperate with the ends of rods 308 is stop arm 315, Figures 5 and 6. As arm 315 rotates, it may move freely past the rods 308 held on the outer edge of the discs, out of the notches. When, however, an alignment of notches occurs and one of the rods 308 drops therein, its end shown in Figure 6 moves into the path of the arm 315 and brings the short shaft 278 to a stop at this position, the friction clutch 281 of the shaft slipping. In this manner, the angular rotation of the shaft is selectively determined in accordance with the operation of disc members 305 which in turn are selectively operated by the associated selector magnets 184, which, as described above, are in turn energized selectively in accordance with the received code combinations of impulses. As recited in the foregoing, the left hand one of the four selectors (Figure 4) is under the control of the four impulses representing the index of the quotation, and the remaining three selections are under the control of the eleven succeeding impulses representing the amount or price. Although a preferred form of selector mechanism is here shown, any other well known type may if preferred be used.

The operation of the price selector mechanism so far described is briefly as follows: Brush 124 of Figure 2 in contacting with segments 18 to 32 operates the selecting magnets 139' to designate which quotation is to be made, that is, high, open, low, or the like, and select the tens, units and fractions of the quotation. When magnets 139' have been selectively energized they are all simultaneously connected to magnets 184 of the price selector whereby current may pass from positive through the selected magnets 184, wires 186, closed contacts 183, to ground, to set the selector levers 295 in accordance with the code combination. Energization of start magnet 193 by way of the timing contacts 187 now causes cam 291 to move rod 290 to the right of Figure 4 to move transfer levers 287 into engagement with the previously set selector levers 295. These transfer levers are oscillated about their pivots 304 in accordance with the setting of magnets 184 and notched code discs 305 of each group are moved to a new position and one spring pressed rod 308 will fall into the aligned notches of each group of discs. Thus a newly selected rod 308 is positioned in the path of movement of arm 315 of the driven shaft 278. Thus shafts 278 rotate to new positions, and the degree of angular movement thereof is determined by the new setting of code discs 305.

*Stock board*

Each of the four short shafts 278 carries on its end a gear 316, Figure 9, suitably secured thereto, which meshes with one of the four gears 317 suitably secured to the end of one of four common idler shafts 320, 320'. Each shaft 320, 320' extends the entire height of the vertical section of the board.

Shaft 320' (Figure 11) carries spiral gear 322 in mesh with a spiral gear 323 fixedly connected to permutation member or index barrel 324, about which further details will follow. There is one such pair of gears 322 and 323 individual to each stock unit 267, 267' and associated therewith. The remaining three shafts 320 carry gears 318 in mesh with gears 319 on short stock unit shafts 326, the latter being rotatably carried in stock unit frame 329.

By gearing the code disc selectors to common idler shafts and then regearing the idler shafts to the stock units, the flexibility of the board proper is enhanced. By this means, it is possible to rapidly and easily remove a single stock unit and replace it with another, should a unit prove defective, without disturbing the remaining units.

Referring to Figure 10, it is observed that the left-hand shaft 326' in the top row of indicators 321 is adapted to support only one indicator drum. The reason for this is that the hundreds value of the stock, which this indicator drum represents, need be shown only for the quotation in the top row, namely "Yesterday's Close". It is left to the observer to correlate the remaining quotations with the "Close" and mentally supply the omitted "Hundreds" digit in order to complete the full four figure quotation.

It will be noted, as previously alluded to, that opposite each indicator 321 there is provided a slot 331 (Figure 8), through which the numbers on the indicators are visible, each indicator being provided with a complete set of ten digits from 0 to 9. It will be noted that five such indicators are carried on each shaft 326, one for each of the five indexes; namely, reading from top to bottom; "Close", "Open", "High", "Low", and "Last" or "Current". A similar set of indicators controlled by a similar arrangement is provided for each digit in a quotation and accordingly there are three such sets, as shown in Figure 10. The fourth or left-hand indicator in the top row (Figure 10) which is mounted on shaft 326', is controlled by the shaft 326 of the adjacent indicator, as will hereinafter appear. Although a preferred form of indicator is here shown, it will be understood that any other of the well known character wheels may, if preferred, be used.

The character-carrying devices or indicators 321 comprise a cylindrical drum portion 332, Figure 12, open at the lower end, the upper or closed end being provided with a series of pressed out portions to form projections 333 adapted to cooperate with latches, as will hereinafter appear, to control the rotation of said drums. Indicator drums 332 are not rigidly attached to vertical shafts 326 but have a tendency to rotate therewith due to the recoil or torque action of a helical spring.

Each drum 332 is adapted to be fixedly mounted on a sleeve portion 334 which is rotatably mounted on shaft 326, Figure 12. Disposed immediately below the upper end of drum 332 and adapted to fit around the sleeve portion 334 is a disc 335, which is adapted to be spring-pressed against the end of drum 332 by a helical compression spring 336 surrounding sleeve portion 334, one end of which bears against a peripheral flange 337 integral with sleeve portion 334. Disc 335 is provided with an integral depending hook 338 adapted to cooperate with a second helical spring 339, as will presently appear.

Adapted to fit over sleeve 334 is a flanged tubular portion 341 rotatable thereon, upon the outer surface of which helical spring 339 is wound. Fixedly mounted in any suitable manner on shaft 326 or 326', as the case may be, and individual to each indicator 321, is arm 342 provided with hook end 343 normally extending in slot 344 of spring member 345, Figure 13, affixed to drum portion 332. Arm 342 thus properly positioned on shaft 326 and secured thereto by set screw 346 serves as a support for its associated indicator drum 332.

Surrounding tubular portion 341 is helical spring 339, previously alluded to, composed preferably of many turns of light wire, one end of which engages the previously mentioned depending hook 338, the other end engaging hook 343 of arm 342. Thus, referring to Figure 13, it is noted that when arm 342 is caused to rotate in a clockwise sense, it tends to wind up helical spring 339, thereby tensioning same, since one end of spring 339 is secured to frictionally held disc 335. But, in the case of those indicators 321 which are not released for rotation, as will hereinafter appear, disc 335 individual thereto will slip in opposition to the frictional resistance, previously alluded to, after the tension of spring 339 has passed a certain value. When in such a case, arm 342 is rotated clockwise through a revolution and past spring member 345, Figure 13, it will deflect the projecting portion of member 345, until it has passed over it.

As previously set forth, shaft 326' (Figures 10 and 12), is adapted to support or carry only one indicator drum. Rotary motion is imparted to said shaft 326', and its individual arm 342 by its geared relation to adjacent shaft 326. Fixedly mounted on shafts 326 and 326' (Figure 10) are alike gears 347 and 348, respectively, and interposed in meshing relation therewith is idler gear 349. Thus gears 347 and 348 are adapted to rotate in like sense. The purpose of this arrangement, as will hereinafter appear, is to effect rotation of indicator 321 on shaft 326', which represents the "hundreds" value of the stock, by rotation of "tens" shaft 326, to the selectively determined position.

Suitably mounted on frame 329, Figures 10 and 12, and vertically positioned below indicator drum shaft 326' is solenoid 253, of well known construction. Appropriately positioned above indicator drums 332 and horizontally disposed is hollow cylindrical index barrel 324, previously mentioned, adapted to rotate on shaft 353 suitably journalled in brackets 354 integral with frame 329. Fixed to index barrel 324 and rotatable therewith is aforementioned gear 323. Thus index barrel 324 is adapted to be rotated to any position selectively determined by selector mechanism 268 at the foot of shaft 320' and transferred through gears 316 and 317 (Figure 9), shaft 320' and gears 322 and 323 (Figure 11) to said index barrel 324.

Index barrel 324 is provided with a plurality of apertures or perforations 357 (Figures 12 and 15) adapted to cooperate with a series of nine testing levers 358. Perforations 357 are arranged in parallel circumferential rows and equally spaced axial rows, perforations being omitted in certain locations, so as to result in coded combinations of perforations being presented to testing levers 358 in any selectively determined position of barrel 324.

Appropriately positioned below index barrel 324, Figures 10 and 12, is an oscillatory bail member comprising a shallow box portion or tray 359 provided with two pairs of ears 361 and 362, ears 361 being pivotally connected at 363 to brackets or supports integral to frame 329. Carried by ears 362 is a rod 364 to the left end of which (viewed in Figure 10) is pivotally connected one end of a connecting link 365 disposed between tray 359 and solenoid 253. Link 365 is of substantially U-shaped construction to avoid obstructing indicator drum 332 positioned above solenoid 253. Solenoid 253 is shown in Figures 10, 11 and 12, in its de-energized condition, and is so constructed that when it becomes energized its core or plunger 366 will be caused to move upwardly, thus imparting clockwise rotation, as viewed in Figure 12, to tray 359 about pivotal points 363.

Pivotally mounted on fulcrum rod 364 is a series of testing levers 358, previously mentioned, each comprising a vertically disposed arm and a substantially horizontal arm. Appropriately positioned on the horizontal arm, with respect to index barrel 324 and presented thereto is a fulcrum detector 367 adapted to cooperate with apertures 357, to detect the presence or absence of fulcrum arcs 367' (Figures 12 and 15) as will appear in the description of operation of the apparatus. Slots in the flanged edges of tray 359 position testing levers 358 and maintain their alignment.

The ends of the horizontal arms of levers 358 are pivotally articulated to individual connecting links 368, which are adapted to connect said horizontal arms and arms 369 of unlatching levers 371, 372 and 373, as the case may be, pivotally mounted on shafts 370 carried on frame 329 and fixed to the shafts by screws 370'. In each instance, that end of link 368 which is associated with arm 369 is provided, in the present embodiment, with a tongue which is adapted to engage an aperture in the end of said arm 369.

Unlatching lever 371 comprises also a vertical arm which is provided with a laterally disposed end 374 adapted to intercept projections 333 on indicator drums 332 to prevent rotation of said indicator drums, when the previously mentioned helical spring 339 is wound up, until said drums are released for rotation by the withdrawal of said laterally disposed end 374, as will hereinafter appear.

Unlatching lever 372 is provided with two vertical arms having laterally disposed ends 374, and lever 373 is provided with three such vertical arms. Thus it is obvious that each lever 372 governs the rotation of two indicator drums 332, and each lever 373 governs the rotation of three drums. It is observed in Figures 11 and 12 that the frame 329 is cut out at points adjacent to indicator drums 332 to permit the cooperation of levers 371, 372 and 373 with their associated drums. Levers 371, 372, and 373 normally tend to rotate into latching engagement with projections 333 due to the retractile action of individual springs 375, Figure 11. Simultaneously, springs 375 tend, through individual links 368, to hold individual levers 358 against stop member 376, which stop 376 is provided to limit in one direction the rotation of levers 358, whose rotation in the opposite direction is limited by the side walls of tray 359.

Referring to Figures 10 and 11, it is observed that coincident with each lever 358 and its associated link 368 is one of the previously mentioned circumferentially arranged rows of apertures 357 in the index barrel 324. Having reference to Figures 12 and 15 it is noted that when an aperture 357 is disposed above fulcrum detector 367 of a testing lever 358, the detector 367 will enter therein when clockwise rotation is imparted to bail 359, as previously set forth, in which event lever 358 will rotate in a like sense about point 377 as a pivot, the link 368, associated therewith, in this instance, remaining stationary.

However, when a solid portion or fulcrum arc 367', Figure 12, of index barrel 332 is positioned above the detector 367 of a lever 358, the upward movement of said detector 367 is limited thereby, thus causing the lever 358 to continue its clockwise motion about arc 367' as a fulcrum instead of point 377, as before. Downward motion thus is imparted to the associated link 368, which in turn imparts clockwise motion to unlatching lever 371 (Figure 15) connected thereto, against the action of individual spring 375.

Lever 371 thus is rotated sufficiently to with-draw the previously mentioned laterally disposed end 374 from its engagement with projections 333, thus permitting the indicator drum 332 associated therewith to rotate due to the drag of its individual spring 339 to a selectively determined position as will clearly appear in the following description of operation.

*General operation*

Having described in detail the construction of the various parts of the price selector and stock board, the general operation will now be described. Referring to Figure 8, it will be noted that the top row in each of the stock or price setting units 267 comprises four slots 331 through which the digits on the indicators 321 are visible, which digits represent from left to right the "hundreds", "tens", "units" and fractions value of the stock. The remaining rows, however, do not exhibit the "hundreds" value, because the values displayed in these remaining rows are obviously determinable from the value shown in the top row. For example, should the value in the top row be 200½, the showing of 01½ in the second row would imply that it is meant to be 201½. Similarly, should the showing in the next row be 99½, it is obvious that 199½ is meant and not 299½. Therefore, this manner of exhibiting the stock prices enhances the simplicity of construction and operation of the apparatus.

Referring to Figure 4, magnets 184 associated with code disc selector units 268, 269, 270 and 271 are each electrically connected to respective contacts in overlap unit 142, as previously noted, and control the settings of the code discs of said selector units in accordance with the received code impulses. In the present embodiment, selectors 268, 269, 270 and 271 control respectively, the "index", "tens", "units" and "fractions" characteristics of the stock quotations.

A special code disc selector mechanism has not been provided for the "hundreds" characteristics, because, as previously described, the "hundreds" value is indicated only in the top row (Figure 8) and is seldom changed, rarely more than once each day, and consequently provision has been made to control the "hundreds" indicator through the medium of the "tens" selector mechanism 269 and a special angular position of the index barrel 324.

It is to be noted that shaft 326' is always positioned along with the next adjacent shaft 326 but that ordinarily the "hundreds" indicator 332 is latched against rotation.

To enable the shaft 326 to control both the "tens" indicator and the "hundreds" indicator two separate index or range code combinations are provided for "Close", which will set the index barrel 324 in a different angular position for each. One code combination pertains to the "Close-hundreds" (abbreviated "Close-H") position of the index barrel 324 and so positions said barrel, as to effect the unlatching of only the "hundreds" indicator, as will hereinafter appear. The other code combination pertains to the "Close-tens, units and fractions" (abbreviated "Close-TUF") position of the index barrel 324, which position effects unlatching of the "tens", "units" and "fractions" indicators, the "hundreds" indicator remaining unaffected, at this time.

Hence, it is apparent that in order to display or exhibit a stock quotation in the top row of the stock unit 267, which row represents, the "Closing" quotation, and including a change in the "hundreds" indicator, two separate messages will be transmitted. To illustrate, it will be assumed that the price 284½ is to be displayed as the "Closing" quotation for the stock whose symbol is ATT. A first message, namely "ATT Close-H 2**" will be transmitted, which will cause, first, the particular stock unit ATT to be selected; then, the digit 2 to be set up on the selector 269 and blanks to be set up on selectors 270 and 271; and next, the index barrel 324 to be properly positioned to effect the unlatching of only the "hundreds" indicator drum. The operation of the stock board will then be initiated to effect the display of the "hundreds" digit or indication of the stock ATT, in a manner hereinafter described.

A second message will then be sent, namely, "ATT Close-TUF 84½", which will cause, first, the particular stock unit ATT to be again selected; next, the digits 8, 4 and ½ to be set up on the selectors 269, 270 and 271 respectively; and finally, the index barrel 324 to be properly positioned, in this instance, to effect the unlatching simultaneously of the "tens", "units" and "fractions" indicator drums. The operation of the stock board will again be initiated to effect the display of the "tens", "units" and "fractions" indication of the stock.

A detailed description of the steps taken in displaying a complete quotation on the stock board is as follows. Magnets 184, associated with range selector unit 268 (Figure 4) are energized in accordance with the "Close-hundreds" code combination to selectively position the index barrel 324 for the "hundreds" indication of the stock; simultaneously selector unit 269 is similarly affected to effect the selection of the proper "hundreds" digit of the stock. Of course, it was noted that normally the selector unit 269 selectively determines the "tens" value of the stock, but as already explained, it is also used to determine the "hundreds" value.

Following instantly upon energization of magnets 184 is the energization of the start magnet 193 (Figure 4) which as previously described, initiates rotation of cam 291 to effect setting of the code discs of selectors 268 to 271, to selectively determine the angular rotation of arms 315, and their individual shafts 278, which angular rotation is transferred to individual shafts 320, 320' through gears 316 and 317 (Figure 9). Thus it is perceived, that when a particular selector unit 268 to 271 is operated, the corresponding vertical shafts 320, 320' (Figures 9 and 10) are also actuated, thus imparting rotation to shafts 326 and 326' in all the stock units 267 in a vertical column. It is obvious that by appropriate gearing and intermediate horizontal cross shafts any number of corresponding vertical shafts may be simultaneously operated and controlled by each selector unit 268 to 271.

In the present instance, only the left-hand shafts 326 and 326' (Figure 10) in the stock units 267 are rotated through the selectively determined angle, thus positioning individual arms 342 (Figures 12 and 13) and tensioning individual helical springs 339 to properly effect the selection of the proper digit. Although all of the shafts 326 and 326' individual to the vertical rows of indicators are thus rotated, the indicators themselves, as previously noted, are latched against rotation by individual arms 374 (Figure 13) in engagement with projections 333 on indicators 321, so that these indicators normally do not rotate.

Rotation of shafts 326 and 326' is clockwise as viewed in Figure 13 whereby hook 343 of arm 342 is carried clockwise. This rotative movement of each arm 342 connected to the rotating shafts carries the lower end of spring 339 clockwise to tension said spring. Now, when the arm 342 has been stopped at a point selectively determined by the associated selector 269, 270 or 271 as previously described, and the selected drum 332 has been unlatched by the release of latch member 374, as will presently appear, the spring 339, whose lower end is now held immovable by the arm 342, will unwind, hence its upper end will tend to carry the disc 335, through the medium of the depending hook 338, in a clockwise direction until the arm 345 is intercepted by the hook 343 of arm 342. Due to the frictional connection between the friction disc 335 and the drum 332, like rotative movement is imparted to the drum 332, so that the selected character or digit is presented toward the aperture, to be exhibited therethrough.

It is obvious that some of the indicators of a plurality of indicators on a shaft are seldom operated and, therefore, continued winding of their individual springs 339 would prove harmful. Consequently, the present invention provides a means for permitting the continued winding of individual springs 339 which, as hereinbefore set forth, comprises a frictional connection through disc 335 adapted to be spring pressed against the drum by spring 330. Thus, after the spring 339 has been fully wound, the continued torque action of winding will cause friction disc 335 to slip with respect to the drum and thus no harm will be done while the particular spring 339 will be effective in case its related drum 332 is unlatched. It is apparent that spring 330 maintains disc 335 under sufficient tension such that there is no lost motion during movement of spring 339.

The indicating drums 332 are not all set back to blank position for the reception of a new quotation, but on the contrary they advance in sequence from the previous quotation to the new quotation. For example, if a drum is indicating the numeral 2 and the next quotation is also a numeral 2, shaft 326 is not rotated and no movement of the released drum occurs. If the next quotation is the numeral 8 the drum advances from its 2 position to its 8 position. If the quotation drops back to the numeral 1 the drum will advance clockwise as viewed in Figure 13 about 10/11 of a complete revolution to the new quotation. Hook 343 in cooperation with the member 344 secured to the drum acts as a positive stop for each drum, so that if drum 332 does not advance at once as the spring 339 is tightened, but on the contrary lags and then jumps to its position, the hook 343 will engage in slot 344 and positively stop the drum 332 in its correct position.

As previously described, rotation of shaft 278 individual to selector mechanism 268 controls, through shaft 320' (Figures 10 and 11) and its associated gears, the rotation of index barrel 324. Thus, the angularity of rotation of index barrel 324 being selectively determined by rotation of selector unit 268, its position to effect the selection of the "hundreds" dial is such that apertures 357 are positioned over all the fulcrum points 367 except that one controlling link 368 individual to the "hundreds" indicator unlatching lever 371. Therefore, when the solenoid 253 (which is selectively determined by the stock selector 171) is energized to effect oscillation of bail 359, lever 358 associated with link 368 will cause rotation of the associated unlatching lever 371 to effect the release of the "hundreds" individual indicator drum 321, which will rotate, due to the recoil or torque action of its spring 339 until the individual spring member 345 (Figure 13) engages hook 343 of individual arms 342. The selected "hundreds" digit thus is presented toward the opening 331 individual to said indicator, all of the other indicators, however, being locked at this time from rotation.

The next step is to actuate the remaining indicator drums in the top row to complete the stock quotation. These remaining drums are actuated simultaneously. A new quotation is set up similar to that shown in Figure 4a, including the stock letters, the index (in this instance "Close-tens, units, fractions"), and the price 84½. The stock and its index having been received as previously described, the proper digit for each indicator is selectively determined in a manner similar to that previously described and the index barrel 324 is repositioned for a "Close-TUF" quotation so that apertures 357 are positioned over every lever 358 except that one controlling link 381 (Figure 11), which when actuated due to the energization of the solenoid 253, will cause the rotation of the associated unlatching lever 373 to effect the release of the "tens", "units" and "fractions" drums 321 of the "Close" row, which will rotate to positions selectively determined by individual arms 342.

Having set the proper "hundreds" quotation, the remaining "Open", "High", "Low" and "Last" quotations are indicated by transmitting only the signals to change the proper "tens", "units", and "fractions" settings until a change in the "hundreds" figure of the quotation again occurs when the "hundreds" dial in the top row of the register is again reset to the proper value as above set forth.

The method of determining and controlling the index characteristic of a particular stock to indicate "Open", "High", "Low", "Last" and "Close" quotations by means of the index barrel 324 is now apparent. Thus the positioning of an aperture 357 over a particular lever 358 assures that the link 368 associated therewith will not be actuated to effect the release of its associated indicator drums.

It is often necessary to change various of the quotations exhibited in stock units 267, so this invention provides novel means for so doing. It is apparent that the quotations displayed in the top row and second row, namely, "Yesterday's close" and "Today's open", need be changed only once each day. However, the quotations exhibited in the remaining rows, viz., "High", "Low" and "Last", are continually changing, so this invention provides means for changing them singly or in various combinations.

Inasmuch as the row exhibiting the "Last" or current quotation is the most active, that is to say, is changed most frequently, its characteristics will now be described. In the present embodiment the "Last" quotation is represented by the bottom row in each stock unit 267. When it is desired to change all three digits in this row, index barrel 324 is so rotated as to position apertures 357 over all the levers 358 except those controlling links 382 and 383. Thus, when solenoid 253 of the selected stock is energized, links 382 and 383 are actuated, as previously set forth, to effect the rotations of associated levers 371 and 372, respectively, to unlatch the associated indicator drums.

But it is often desirable to change only the units and fractions digits in the particular quotation, in which event the index barrel 324 is selectively positioned, so as to present apertures 357 over all levers 358 except that one individual to link 383, which will effect the unlatching of the units and fractions indicator drums.

In like manner the unlatching of the indicator drums in the third and fourth rows is similarly effected through their individual links 384 to 388.

It is also frequently desirable to simultaneously change two or more of the rows of quotations, either in whole or in part. For instance, if the "Last" quotation should be also a new "High", this invention provides the above described means whereby the new quotation can be simultaneously recorded in the third and last rows. In this event, the index barrel 324 is rotated so as to position apertures 357 over all the levers 358, except those individual to links 382, 383, 385 and 387, the unlatching of the associated indicator drums being effected as previously set forth. Should it be desired to change only the units and fractions in these last mentioned rows, links 383 and 387 only are actuated, a new position of the index barrel 324 being effected therefor. Rows four and five, representing the "Low" and "Last" quotations, respectively, of the stock are adapted to be affected similarly.

Usually, both the numerator and the denominator of a fraction are shown on the "fractions" indicators. To enhance the visibility of the figures on the "fractions" indicator, it is desirable to show the fractions of a larger size. To accomplish this the numerator only is shown, which may then be of a size equal to the other digits. In this event, the denominator of the fractions would be denoted by a distinguishing color.

*Modification embodying electromagnetic type of indicator*

Figure 16:
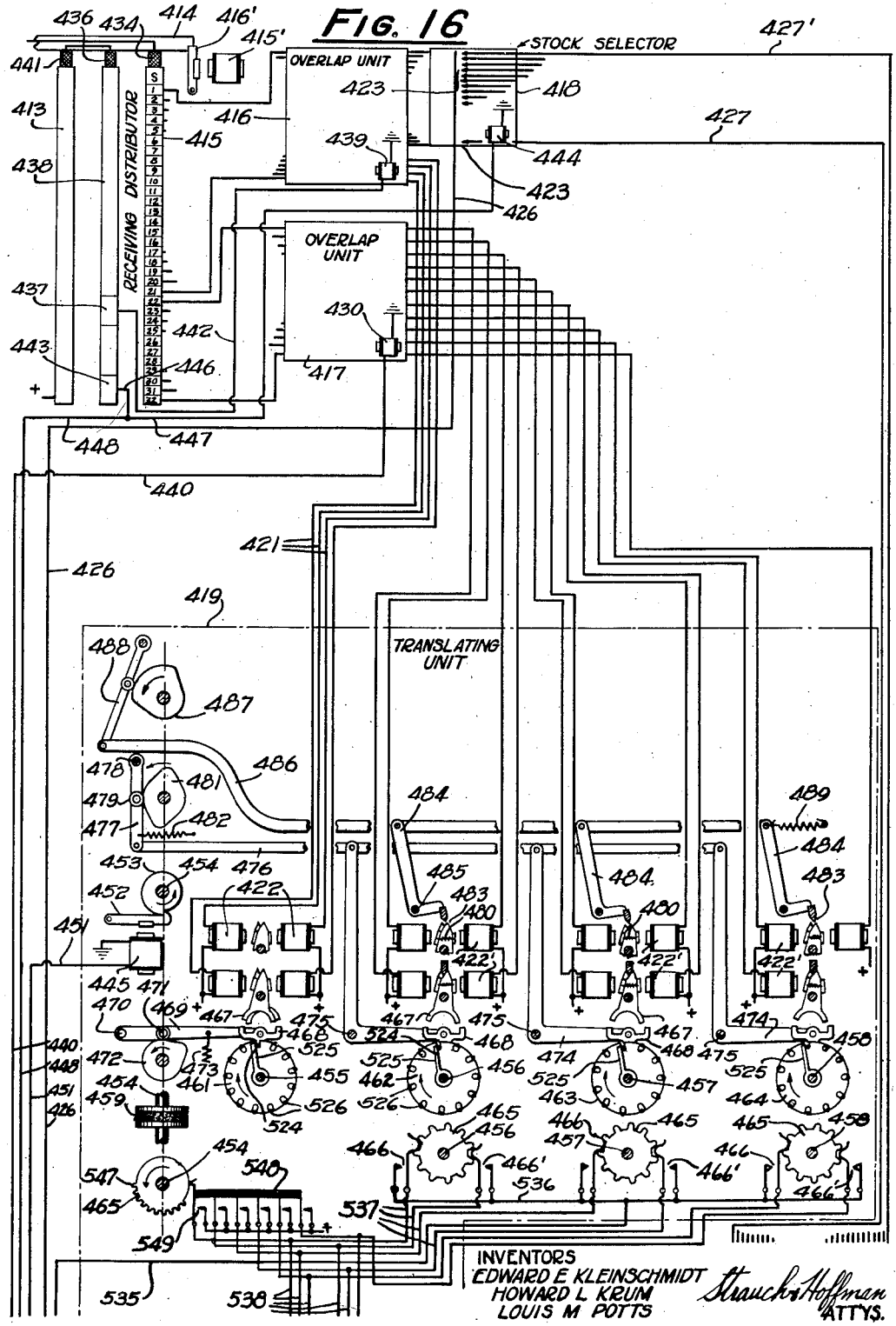
Figure 16 is a diagrammatic view of the circuits and apparatus for a receiving distributing arrangement used in connection with a modified form of indicator of the electro-magnetically operated type shown in Figure 18.

A modification of this invention in which electromagnetically operated indicator drums are employed is disclosed in Figures 16 and 17. In this adaptation the stock boards used are similar in external appearance to that shown in Figure 8. However, the indicator units 401, are of a different construction, being substantially as shown in Figure 18, and are adapted to be positioned behind the apertures 331 (Figure 8) to exhibit its characters or digits therethrough.

Briefly, indicator unit 401, Figure 18, comprises essentially an electromagnet 403, and an indicator drum 404. Indicator drum 404 is adapted to rotate on individual shaft 405 (Figure 18). Each indicator drum 404 is rotated in a step-by-step manner by a double-pawl ratchet-drive means comprising a star ratchet wheel 406 and a pair of pawls 407, 407' mounted integrally on lever 408 pivoted at 409.

Lever 407 is also provided with an armature arm 411 adapted to co-act with electromagnet 403 to effect rotation of indicator drum 404. When magnet 403 is energized, as will hereinafter appear, it will attract its armature 411 to impart rotation in a clockwise sense to lever 408 against the action of spring 412 thus causing pawl 407' to force ratchet 406 to rotate in a counter-clockwise direction. Upon de-energization of magnet 403, lever 408 is caused to rotate in a counter-clockwise sense due to the pull of spring 412 thus causing pawl 407 to advance ratchet 406 in like manner. Thus each complete oscillation of lever 408 advances or rotates indicator drum one complete step to exhibit the succeeding digit.

Having reference to Figure 16, it is observed that only that part of the receiving distributor essential to a disclosure of the present modification of this invention is shown, since that part, not shown, to the left of distributor ring 413 is substantially identical to the similar part shown in Figure 2.

Thus to initiate rotation of distributor arm 414, Figure 16, start magnet 415' is energized by a start impulse to actuate its armature 416' to effect release of arm 414 in a manner similar to that previously described for start magnet 122, Figure 2.

Similar to the receiving apparatus shown in Figure 2, the received impulses affect a polar receiving relay (not shown in Figure 16) to effect, through the segments in segmented ring 415, energization of selector magnets (not shown) in the overlap units 416 and 417, which in turn effect through mechanical means the closing of message storing contacts, similar to those previously described in overlap units 141 and 142. (Figure 2).

However, in this instance, it is noted that segments one to twenty-one on ring 415 are each electrically connected to associated selector magnets in overlap unit 416. Likewise, segments twenty-two to thirty-two are electrically connected to associated selector magnets in overlap unit 417. Hence, that part of the complete stock quotation which pertains to the name of the stock and its nature (as "common" or "preferred") and also its index (as "Close" or "Last") are stored in the overlap unit 416; and that part pertaining to the price of the stock is stored in overlap unit 417. The reason for storing the index selection in the same overlap unit with the stock selection is to provide sufficient time to perform the various operations relative to the index selection, and as will be observed hereinafter, the operation of unit 416 is initiated before that of unit 417.

Storing contacts in overlap unit 416 are electrically connected to individual selector magnets in the stock selector unit 418 precisely as in the case of the stock selector unit 171 (Figure 3) previously described. Also four of the storing contacts in unit 416 are electrically connected to individual selector magnets in translating unit 419 (partly shown on Figure 16 and partly on Figure 17) from ground through the individual storing contacts (not shown) in the unit 416, over individual conductors 421 through windings of individual selector magnets 422 in the translating unit 419 to positive. The control of magnets 422, of the left-hand selector unit by overlap unit 416 is to set the index or the stock, and also to set the "hundreds" dial.

When individual contacts 423 in stock selector unit 418 are closed in the manner similar to that described for unit 171 (Figure 3) energizing circuits are prepared for relays such as 424 (Figure 17) from positive battery, through cam operated contact 425 (in translating unit 419) which remains open at this time, thence over common conductor 426, through a pair of closed contacts 423, over a conductor 427, through winding of a relay 424 to ground. Closing of contacts 425 at the proper time completes the energizing circuit for selected relay 424 which closes its associated contacts, one pair of contacts 428 of which completes a locking circuit for relay 424 previously prepared from positive battery through cam operated contact 429 (now closed) over conductor 431 and 432, through contact 428 and winding of relay 424 to ground. Thus the contacts associated with relay 424 are held closed to prepare energizing circuits for magnets 403 in the indicator units 401 as will hereinafter appear.

In this connection it is observed that conductor 427' is shown merely to illustrate the fact that other individual contacts 423 in the stock selector 418 are electrically connected to their associated relay magnets, similar to magnet 424, only one magnet 424 with its associated armature and contacts being shown. Magnets 424 are the stock board relays and correspond to magnets 253 of Figures 3 and 10. Although only one magnet 424 is shown it will be understood that there will be one such magnet for each stock and each magnet will have a plurality of contacts, as the one shown.

After brush 434 on distributor arm 414 (Figure 16) moves off the twenty-first segment on ring 415 it is noted that energizing circuits for the selector magnets in overlap unit 416 have been completed to selectively determine the stock to be affected and also its index. This part of the cycle having been completed brush 436 then contacts with segment 437 on ring 438 to complete an energizing circuit for start magnet 439 in overlap unit 416 from positive battery through ring 413, brushes 441 and 436, segment 437 (with which brush 436 is now in contact) over wire 442, through winding of start magnet 439 to ground. Thus energization of magnet 439 initiates operation of overlap unit 416 to effect the transfer of the message to the storing contacts, as previously described in connection with overlap unit 141, Figure 2.

Now, while overlap unit 416 thus is functioning, the selector magnets in overlap unit 417 are being energized, in accordance with the received code, while brush 434 is traversing segments twenty-two to thirty-two. Near the completion of the revolution of distributor arm 414, brush 436 traverses segment 443 of ring 438 to complete, simultaneously, energizing circuits for start magnets 444 and 445 in the stock selector 418 and translating unit 419, respectively. Although the price selection thus is stored in overlap unit 417, operation of the overlap unit is not initiated until cam controlled contact 429, Figure 17, has been closed as hereinafter described to complete an energizing circuit for start magnet 439 in the overlap unit 417 from positive battery, through contact 429, over wire 440, through winding of start magnet 430 to ground.

Energizing circuit for magnet 444 is completed from positive battery through ring 413, brushes 441 and 436, segment 443, (with which brush 436 is now in contact), over wire 446 thence over wire 447, through winding of magnet 444 to ground. The energizing circuit for magnet 445 is completed from positive battery over the same circuit up to wire 446 and thence over wire 448, through the cam controlled contact 449, Figure 17, which contact is normally closed, thence over wire 451, through winding of magnet 445 to ground.

The effect of energizing magnet 445 is to initiate the operation of translating unit 419 by pulling armature latch 452 to release stop disc 453 and shaft 454, to which the disc is fixed, for rotation. The ensuing operations and functions will presently appear after a brief description of the construction of translating unit 419.

In translating unit 419 cam shaft 454 and code disc selector shafts 455 to 458 are geared to a continuously rotating drive shaft (not shown) which in the present instance is motor driven.

Rotation is imparted to cam shaft 454 through a friction clutch 459. Code disc selector shafts 455 to 458 are also provided with friction clutches (not shown).

Code disc selectors 461 to 464 are similar in construction and operation to selectors 268 to 271, Figure 4, and previously described. The setting of the code discs of each of these units 461 to 464 is controlled by four magnets 422, 422' suitably mounted above each selector, similar to units 268 to 271. Each of selector units 461 to 464 is provided with a "blank" rod 524 in addition to stop rods 526, whereby the movable arms 525 may return after each setting to an initial blank position, as hereinafter described.

Referring to Figure 16, code disc selector 461 selectively determines and controls the index characteristic of the particular stocks, such as "Open", "Close", or the like, and the "hundreds" figures thereof. The other selectors 462, 463, and 464 control the "tens", "units" and "fractions" values of the stock, and are provided on the end of their respective shafts 456, 457 and 458 with individual pulsing cams 465 adapted to coact with a pair of make contacts 466 and 466', for generating actuation pulses required for the operation of the indicator units 401 (Figure 18) in the stock board.

Associated with each of the four selector magnets 422 and 422' of selector units 461 to 464 are selector levers 467 and transfer levers 468 which are of similar design and perform the same function as the respective levers 285 and 287 (Figure 4) previously described. Selector levers 467 of units 462, 463 and 464 are biased by a spring (not shown) to an initial or "blank" position, and are latched in each new position by latches 483.

Transfer levers 468 associated with code disc selector 461 are pivotally mounted on the end of transfer lever bail 469 which is pivoted at 470, and provided with follower roller 471 adapted to co-act with cam 472. Lever 469 is adapted to be rotated in a counter-clockwise sense by cam 472 against the action of retractile spring 473 to effect movement of the code discs in selector 461 as hereinbefore described.

Similarly, transfer levers 468 individual to selectors 462 to 464 are pivotally mounted on bell crank levers 474 individual to each selector. Each bell crank 474 is pivotally mounted on an individual pivot 475 and is linked to lever 477 by link 476. Lever 477 is pivoted at 478 and is provided with a cam follower roller 479 adapted to co-act with cam 481.

Link 476 is adapted to reciprocate in a horizontal direction due to the action of cam 481 upon lever 477 against retractile spring 482, thus imparting oscillatory motion to individual bell cranks 474 about pivots 475 to effect the setting of the code discs as hereinbefore described.

Selector levers 467 employed in this instance are provided with V-shaped ends and are adapted to be locked in the selectively determined positions by individual locking bails 483 mounted on individual bell cranks 484 which are adapted to be oscillated about their individual pivots 485, through link 486 by the action of cam 487 upon lever 488 against the action of spring 489.

Having reference to Figure 17, there are mounted on the end of cam shaft 454 cams 491 to 496 which comprise the timing unit and which are adapted to operate contacts individual thereto to complete electrical circuits, some of which have already been described and others which will presently be described.

Rotatably mounted on the extended index selector shaft 455 are the various index selecting cams 501 to 509. Associated with each cam 501 to 509 are individual selector levers 511 pivotally mounted on common pivot 512 and normally tending to rotate in a counter-clockwise sense into cooperative relation with their respective cams due to individual springs 513. Such cooperative relation is prevented, however, while cams 501 to 509 are being rotated to their selectively determined positions by bail 514 integral with lever 515.

After the positions of the various cams 501 to 509 have been selectively determined by index selector 461, lever 515 is caused to rotate in a clockwise sense about shaft 455, on which it is loosely mounted, by action of cam 516, mounted on cam shaft 454, to effect first the release of bail 514, (which, as is noted, oscillates with lever 515 in a clockwise sense) and secondly the rotation of contact levers 522 in the following manner.

Bail 514 having been released, selector levers 511 are permitted to rotate in a counter-clockwise sense by springs 513 into cooperative relation with their associated cams 501 to 509. It is observed that this rotation of levers 511 will be greater for those levers 511 whose feelers 518 have found and entered a notch 519, thus causing selector levers 511 to assume either one of two selectively determined positions.

Continued clockwise movement of lever 515 then effects through the cooperation of selector levers 511 and their associated transfer lever 521 oscillation of their associated contact levers 522 to either their clockwise or counter-clockwise position, transfer levers 521 being pivoted on bell crank 520 which is operated by a cam on lever 515 to move transfer levers 521 into engagement with the feelers of selector levers 511. A spring (not shown) is connected to bell crank 520 to return transfer levers to the position shown in Figure 17. When contact levers 522 assume their counter-clockwise position, they will close their associated contacts to complete energizing circuits for the magnets 403 in the indicators 401, which circuits have been previously prepared by the closing of the contacts associated with one of the relays 424, previously described.

At a predetermined instant in the cycle of operations of translating unit 419, contact 420 (Figure 17) hereinbefore mentioned, is closed to complete an energizing circuit for start magnet in overap unit 417 from positive battery, through contacts 420, over wire 440, through winding of magnet 430 to ground.

Operation of overlap unit 417 thus causes energizing circuits for selector magnets 422' of selector units 462, 463 and 464 to be completed in a manner similar to that hereinbefore described for selector magnets 184 in Figure 4. Thus when cam 481 operates bell cranks 474 to a new setting of the discs the rods 524 for the blank positions are withdrawn from the path of arms 525 thereby permitting arms 525 to rotate in a clockwise sense until stopped by one of the rods 526, which has been pulled into an alignment of notches in the code discs, in a manner as previously described in connection with the similar code discs 282, Figures 5 and 7.

In this connection it is noted that arms 525 and pulsing cam 465 are fixed to the selector shafts 456, 457 and 458 and when each arm 525 thus is permitted to rotate its cam 465 likewise rotates. Each cam 465 is provided on its periphery with a plurality of cam projections equal in number to the number of rods 526 in its selector unit. In the selectors 462, 463 and 464 there are eleven each of the rods and cam projections. Thus, when an arm 525 is permitted to rotate through the angular distance of four rods 526 (which rods are equally spaced about the circumference) contact pairs 466 and 466' will be affected successively by four cam projections thus closing these contacts four times thereby completing, successively, four times the energizing circuits for magnets 403 of the selected indicator units 401.

There are three distinct energizing circuits possible to effect the energization of magnets 403, designated as circuits A, B, and C, which serve the following purposes:

A—To step the selected dials from "blank" to their first position.

B—To step the dials from their first position to the correct quotation, as for example, to 7.

C—To return the dials to "blank" in readiness for a new quotation.

These circuits A, B, and C will now be described.

Referring to Figure 16, arms 525 are shown in the "blank" position, that is to say, when arms 525 are in this position no digits are being exhibited through openings 331 (Figure 8) in the stock board. Likewise, referring to Figure 18, rings 527 and 528 of indicator unit 401 are also shown in the "blank" position and contact 529 associated with cam 496 on cam shaft 454, is normally open as shown.

It is observed that ring 528 is broken and that lateral projection 531 on ring 527 is disposed therein. Also, it is noted that contactor 532 is constantly in contactual relation with ring 527, and that contactor 533 is alternately in contactual relation with projection 531 and broken ring 528. When contactor 533 is in contact with projection 531 the indicator dial or drum 404 is in the "blank" position, as previously mentioned.

Circuit A. Now, immediately preceding withdrawal of rods 524 from the path of arms 525, contacts 529 and 534 (Figure 17, Sheet 6) are closed by their respective cams 496 and 494 to prepare an energizing or pulsing circuit for magnets 403 from positive battery, through contact 534, over wires 535, and 536 through pair of contacts 466 and 466' (which are not closed until cam 465 begins to rotate, after which time they are opened and closed successively) over wires 537 and 538 (the circuit through contact 466 only will be traced, as it will be assumed that contact 523 only is closed) through contact 523, over wire 539 through one of the contacts 540, over wire 541, through winding of magnet 403, over wire 542, through contactor 533, ring 527, contactor 532, over wires 543, and 544, through contact 545, over wire 546, through contact 529 (which is now closed) to ground.

So when arm 525 is permitted to rotate due to withdrawal of rod 524, as mentioned above, the first time contact 466 is closed the above described circuit for magnet 403 will be completed. Thus energization of magnet 403 effectuates the rotation of indicator drum 404 one step to exhibit the first digit as previously described.

This rotation of drum 404, and consequently the associated rings 527 and 528, changes the previous contactual relationship between the said rings and contactors 532 and 533. Thus projection 531 has now moved out of contactual relationship with contactor 533, which contactor is now in contact with ring 528. The previously described energizing circuit A for magnet 403 thus is broken and a new circuit B is introduced or prepared as follows:

Circuit B. From positive battery through contact 534, which still is closed, over wires 535 and 536, through contact 468 (when closed successively by pulsing cam 465), over wires 537 and 538, through contact 523 (still closed) over wire 539 through one of the contacts 540, over wire 541, through winding of magnet 403, over wire 542, through contactor 533 and ring 528 to ground. This is the circuit that is successively completed to effect step-by-step rotation of indicator drum 404 until arm 525 is stopped by a rod 526 in any selectively determined position. Each time magnet 403 thus is energized indicator drum 404 thereof is rotated one step. The selectively determined digit thus is exhibited through its associated aperture in the stock board.

Now, arm 525 is not permitted to remain in this selectively determined stop position but must again be returned to its blank or normal rest position shown in Figure 16. To accomplish this, contact 534 (Figure 17) is opened through the medium of the associated timing cam 494, thus breaking the last described energizing circuit for magnet 403; then link 476 (Figure 16) is again reciprocated by the other half of double cam 481 to again oscillate bell cranks 474 to effect the "blank" selection through the medium of transfer levers 468 and selector levers 467 (the selector magnets 422, 422' now are de-energized since cam contacts 420 are now open and bail 483 raised). Thus the previously selected rod 526 will be withdrawn from the path of arm 525 permitting said arm to rotate to the "blank" position, being there stopped by rod 524 which has been selected by the recent operation of bell crank 474.

In the present condition of the apparatus it is noted that arm 525 is in the blank position and the previously selected digit on the indicator drum 404 is exhibited on the stock board. Thus it is seen that arm 525 is now in readiness to effect the selection of the succeeding digit, but before this can be accomplished the indicator drum 404 must be rotated or restored to the blank position. To do this a third energizing circuit designated C for magnet 403 is provided as follows:

Circuit C. Mounted on cam shaft 454 is restoration cam 546, Figure 16, which is provided with a plurality of cam projections 547 (ten in the present embodiment) adapted to co-act with a multiple contact switch 548 to make and break contacts 549 to complete the aforementioned third energizing circuit for magnets 403 from positive battery, through any one of the contacts in switch 548 which are simultaneously closed by projections 547, as for example 549, over wire 538, through contact 523, over wire 539 through one of the contacts 540, over wire 541, through winding of magnet 403, over wire 542, through contactor 533, and ring 528 to ground.

Now, immediately preceding the withdrawal of rods 524, as hereinbefore described, to release arms 525 of selector units 462, 463 and 464 to effectuate selection of the next digits, restoration cam 546 is caused to rotate to transmit (in this instance) ten impulses over the aforementioned third energizing circuit for magnet 403 to restore or rotate the indicator drum 404 in a step-by-step manner to the blank position which is accomplished in the following manner.

Each impulse sent through the restoration contacts causes the selected indicator drums 404 to be rotated one step until the drums have been rotated to "blank" position, that is when contactor 533 and projection 531 (Figure 17) are again in contactual relationship, at which time the herein designated third energizing circuit for magnet 403 is broken and the circuit over contactor 532 and wire 543 etc., is not yet completed, since contact 529 has not been closed as yet by cam 496.

Thus it is observed that it does not matter to what extent the indicator drums 404 have been previously rotated, they will always be restored to blank position by the restoration operation before a succeeding position is selectively determined.

General operation

The operation of the modification shown in Figures 16 and 17 will now be described. Referring to Figure 17, it will be seen that the price setting units for the stock board 551 (similar to units 267, Figure 8) include five horizontal rows, the top row consisting of four indicator drums 404 and the remaining rows consisting of three drums each. The reason for this arrangement is identical with that set forth for units 267, namely, that the "hundreds" quotation need be made only in one horizontal row, preferably the "Close" row. This "hundreds" quotation is made by the "tens" selector unit in one quotation, and the "tens", "units" and "fractions" are quoted in a subsequent quotation, as explained hereinafter.

Indicator drums 404 in the selected unit 551 are positioned by pulsing impulses over circuits including contacts 523 and 552 to 556, which contacts are electrically analogous to the mechanical method employed in the previously described embodiment of Figure 11 in which the unlatching levers 371, 372 and 373 are used. That is, when it is desired to operate a combination of indicator drums 404 the corresponding contacts 552 to 556 are closed by selective operation of the desired contact levers 522.

For example, when the left indicator drum 404 in the top row of unit 551 is to be operated, thus quoting a "hundreds" figure in the "Close" row, cam 509 is operatively set as previously described, to effect closing of contact 523. If the remaining indicator drums of this same row are to be operated, a subsequent quotation is received, whereby cam 508 is properly set to effect simultaneous closing of contacts 552, 553 and 554. When the indicator drums in the second row or "Open" row are to be positioned, cam 507 is operated to effect closing of contacts 555, 556, and 557. Similarly the proper positioning of cams 501 to 506 singly or in any desired combination will effect the closing of their associated contacts to determine the operation of the corresponding indicator drums.

It will be assumed that a quotation of 284½ Close for stock ATT is to be quoted. The parts are shown in Figures 16 and 17 in their position of normal rest prior to the beginning of a quotation. Upon the reception of a start signal, start magnet 415' is actuated to release distributor arm 414 to transfer the electrical conditions previously put on the segments of ring 415 to overlap units 416 and 417. As brush 434 contacts segments 1 to 21 of ring 415, magnets in overlap unit 416 are operated as previously described. These signals select the stock to be quoted, in the example given ATT and furthermore select the nature thereof, such as first preferred, second preferred, or the like, and also select the index or range of the stock such as "Open", "Close", "High" or the like.

When brush 436 engages segment 437, start magnet 439 of unit 416 operates to transfer the setting of the magnets in this unit to stock selector 418 and to transfer the setting of magnets connected to wires 421 to the left-hand selector unit 461 to operate magnets 422 thereof. Magnets of stock selector 418 are thus positioned for subsequent release of the stock bars whereby one stock bar may engage conductor 426 when release magnet 444 operates.

Continued operation of the arm 414 transfers the electrical conditions from segments 22 to 32 to overlap unit 417 to set the magnets thereof in a manner previously described. In the example given, the magnets of selector unit 462 will be set for the Figure 2, units 463 and 464 being blank. When brush 436 engages segment 443, release magnet 444 of stock selector 418 is operated from positive, over ring 413, brushes 441, 436, segment 433, wire 447, magnet 444, to ground. The selected stock bar thus closes its individual contact against wire 426 but this circuit remains open until cam 493 later operates to close contact 425. An additional circuit is closed when segment 443 is engaged from positive, over ring 413, brushes 431, 436, segment 443, wire 446, wire 448, to contact 449 which is normally closed at this time, wire 451 to release magnet 445 in translating unit 419, and to ground.

As previously stated, magnets 422 of selector unit 461 have been set to select the "hundreds" dial for the stock. In the present embodiment this "hundreds" dial is positioned in the "Close" row but it could be associated with any row or any number of rows, if desired. When magnet 445 operates, shaft 454 is released and cam 472 at once raises arm 469 to engage transfer levers 468 with selector levers 467 to reposition the discs of this selector unit 461. In the selected example, arm 525 is released to move to the "hundreds" position. Rotation of shaft 455 when arm 525 moves to its new position operates to set cam 509 so that contact 523 will be closed when transfer levers 521 engage the feeler fingers 511 to operate switch levers 522. Therefore the next operation is movement of lever 515 by its cam 516 mounted on shaft 454, which will move lever 515 clockwise to allow feeler levers 511 to assume their new positions by movement of stop bar 514 out of engagement therewith, and further movement of lever 515 engages transfer fingers 521 with the newly-set levers 511 to close the switch 523 for a "hundreds" quotation.

Further rotation of shaft 454 next closes switch 425 to close the circuit for the selected stock magnet 424 as follows. From positive, to contact 425, wire 426, through selected stock bar 423, of stock selector 418, to wire 427, through magnet 424, and to ground, thus closing all of the contacts of the selected stock. As previously indicated this modification operates on the principle of resetting all selected dials to their blank position prior to a new quotation being made thereon. Therefore the next step is to reset the selected "hundreds" dial of the selected stock A.T.T.

The projections 547 of cam 465 which is mounted on shaft 454 now engage the contact 548 to simultaneously close contacts 549 to set the selected dial back to blank position. This is circuit C previously referred to and is closed from positive, to contact 549, wires 537, 538, closed switch 523, wire 539, closed contact 540 of operated relay 424, and to the dial magnet 403, wire 542, contact 533, ring 528 to ground. Therefore each impulse in this circuit will operate magnet 403 to step the "hundreds" dial one step until the dial returns to blank position shown in Figure 18, when contact 533 breaks contact with ring 538. Therefore subsequent impulses for a magnet which has returned to blank position will have no effect thereon. These resetting impulses are ten in number in order to return the dials to their blank position from any setting.

It may be noted that the circuit for the selected stock is self-locking when contacts 429 engage so that subsequent release of contact 425 will leave the selected stock magnet 424 in closed position.

Further rotation of shaft 454 causes cam 491 to close contact 420 which will energize release magnet 430 of overlap unit 417 and permit the latter to energize magnet 422' of its associated selector units 462, 463 and 464 for moving the levers 467 thereof. Cam 487 now releases bell cranks 484 to allow locking members 483 to latch selecting levers 467 in their new positions. Cam 481 now moves lever 476 to cause transfer levers 462 to engage selecting levers 467.

Just prior to the release of selectors 462, 463 and 464 by cam 481, circuit A above referred to is closed by cams 494 and 496 closing contacts 534 and 529. This is the circuit to set the "hundreds" dial from blank to its first position, and the circuit may be traced from positive, to contact 534, wire 535, wire 536 to pulsing unit 465 of selector 462 which successively closes contact 466 in rotating to its new position, then to wires 538, closed switch 523, wire 539, contact 540 of the selected stock, to the dial magnet 403, wire 542, contact 533, contact 531, contact 532, wire 543, wire 544, contact 545, to closed contact 529, to ground. This circuit will set the "hundreds" dial from its blank to its first position and this circuit is then at once broken by disengagement of contact 533 from tongue 531 of the unit 401 (Figure 18). Circuit B is at once closed by engagement of contact 533, with the grounded ring 528 so that continued rotation of pulser 465 of selecting unit 462 will step the "hundreds" dial to its new position in accordance with the rotation of stop arm 525 of the selecting unit 462, in the instance given to indicate the figure 2. Arm 525 will be stopped in the newly selected position by the selected rod 526. Units 463 and 464 will not operate since their magnets 422' were not changed, it being remembered that the "hundreds" quotation only is being made.

Referring to Figure 2, it will be recalled that the contacts closed in the overlap unit 142 are opened after this unit completes its cycle. Contacts of overlap unit 417 are similarly arranged whereby they at once open after they have selectively energized magnets 422'. It will be recalled that selector levers 467 each have springs associated therewith to return the levers to a blank position on the selecting unit. Locking levers 483 operated by cam 487 are therefore provided to maintain selecting levers 467 in their newly set positions, even though magnets 422' have been released and the springs 480 are biasing these levers, to their initial or blank position. Therefore, the next operation is the raising of locking levers 483 by cam 481 whereby the selecting levers 467 return to blank positions.

It will be noted that cam 481 has two high portions thereon, and the second high portion thereof now engages lever 477 to raise bell cranks 474 and thus engage transfer levers 468 with selector levers 467 which are now in their blank position. Therefore, arms 525 of selector unit 462, 463, and 464 are now released for return to their blank position shown in Figure 15. This movement of the selector unit also operates pulsing units 465 but at this point in the operation of the apparatus, contacts 534 and 529 are again open and therefore no current is applied to wire 535.

In the meantime cam 516 on shaft 454 has allowed lever 515 to resume its position shown in Figure 17 thus moving all of the feeler levers 511 out of engagement with the members 501 to 509 and lever 521 resumes the position shown in Figure 17 and any contact lever 522 opens the contacts associated therewith.

Shaft 454 makes one complete revolution and is then stopped by engagement of armature 452 with stop 453, magnet 445 having been previously deenergized. The parts are thus returned to the position shown in Figures 16 and 17. It will be noted that the distributor arm 414 may continue its rotation for selecting the next quotation, since a complete overlap is provided whereby the translating unit 419 is initiated in operation at the completion of a selection upon the ring 415. Therefore there need be no pause in the reception of the quotations.

When the parts resume the positions shown the entire receiver is ready for the next quotation, which, as above stated was being stored in the overlap units 416 and 417 during operation of translating unit 419.

By the operation of the device as above described it will be seen that the "hundreds" dial of the selected stock, in the example, A.T.T. has been operated. In order now to operate the "tens," "units" and "fractions" of this stock to the figures 84½, a new quotation is received. It will be understood that the "hundreds" quotation is seldom changed, and generally the stock will be quoted by changes only in its tens, units or fractions. In some instances it will be necessary to change only the units or possibly change the fractions, in which instance the selected contacts 552 to 556 may be closed as to operate only one or possibly two dials of the selected stock.

In the instance given, after the stock A.T.T. has had its "hundreds" dial changed to the figure 2, the above described operations are repeated and the stock A.T.T. is selected, and the first preferred or second preferred, or the like, is selected on overlap unit 416. The index of the stock is also selected on overlap unit 416, in the instance given being "Close" for the selected stock. The price quotation for the tens, units and fractions is then stored in overlap unit 417 and the mechanism operates as above described, briefly as follows. Selector unit 461 operates to close contacts 552, 553 and 554 thus closing the circuits to "tens", "units", "fractions" magnets 403 of the "Close" quotation. Pulsing unit 546 then sets the dials back to their blank position, and selector units 462, 463 and 464 pulse the circuits to set the dials to their new positions, in this instance 84½ on the "tens", "units", and "fractions" dials. It will be noted that the "tens" selector unit 462 is operating its own "tens" dial in this instance, the circuit to the "hundreds" dial being at this time open, since contacts 523 are open.

The parts go through the cycle as above described and return to their normal position shown in Figures 16 and 17 ready for a subsequent quotation.

*Modification embodying cross-magnetic field type of indicator*

A modification of this invention in which the cross-magnetic field type of indicator drums or dials is employed is disclosed in Figures 19 to 25. In this adaptation the stock boards used are similar in external appearance to that shown in Figure 8. However, indicator units 571 are of a different construction being substantially as shown in Figure 19 and adapted to be positioned behind apertures 331 (Figure 8) to exhibit their characters or digits therethrough.

Figures 20 and 21 show schematically the principles of the modified form of indicator 571 shown in Figure 19. In Figure 21 a built-up laminated core consisting of iron discs 572 is provided with two windings 573 and 574 positioned at right angles to each other. Current flowing through these two windings will produce a resultant field as shown in Figure 23 for rotating a pivoted indicator (not shown) to assume a position in the field in accordance with the resultant field obtained.

Similarly, in Figure 20, a laminated core of iron discs 572' is provided with three windings 575, 576 and 577 positioned at 60° to each other. Likewise, current flowing through any two of these three windings will produce a resultant field as shown in Figure 22 for rotating a pivoted indicator to assume a position in the field in accordance with the resultant field obtained.

Referring to Figures 22 and 23 it will be noted that by varying the relative directions of a field, a magnetic needle may be made to assume any number of desired positions. For the "hundred", "tens" and "units" indicators twelve such positions are desired, one for each of the ten numbers 0 to 9 and two blank positions. To accomplish this an armature wound in the manner shown in Figure 20 is employed.

For the fractions indicator eight such positions are desired, one for each of the fractions ⅛ to ⅞ and one blank position. To accomplish this an armature wound in the manner shown in Figure 21 is employed.

Two current values, namely a strong and a weak, are used; that is, certain positions of the indicator are obtained by impressing a strong current on any one of the windings, while certain other positions are obtained by impressing weak currents of equal value on any two windings. In the latter case, the weak currents as components will be of such value or strength as to produce a resultant whose vector value will be equivalent to the vector value of either strong current. For example, referring to Figure 23, when a single strong current of vector value 579 is impressed on any single coil the indicator will assume a certain position; and when weak currents of vector value 578 are impressed on both of the windings a resultant 581 is obtained whose vector value is equivalent to vector value 579.

In Figure 19, a more detailed illustration of indicator unit 571 is shown. Armature 582 is wound as shown, for example, in Figure 20, and is mounted upon a stud 583 secured to base 584. A permanent U-shaped magnet 585 is secured fast to one end of a spindle 586, the other end of which is journaled on a bearing in a recess in stud 583 in engagement with a ball 587 at the base of the recess. Fast to magnet 585 is drum 588 having on its circumferential edge the numbers or other indications which it is desired to exhibit. Each drum 588 is provided with a series of pressed out portions to form projections 589 adapted to cooperate with latches (not shown) to control the rotation of said drums in a manner similar to that shown in Figure 15 and previously described wherein projections 333 and latches 374 control the rotation of indicator drums 321.

Figure 25 is a schematic electrical diagram of the price selecting unit employed in connection with the present modification of this invention. It should be understood that Figure 25 must be read with Figures 2 and 3, hereinbefore described, to complete the receiving station for the employment of this modification.

In this arrangement the stock designation which is stored in overlap unit 141, Figure 2, is transferred to stock selector 171, Figure 3, where the closing of a contact 248 is selectively determined to effect energization of its associated solenoid 253'', Figure 25, (which is similar to solenoid 253, Figure 3) which when energized at the proper time, governed by timing unit 196, Figure 3, effects unlatching of the selected dial or drum substantially as hereinbefore fully described, in connection with Figures 11 and 12.

Also, the index and price selections which are stored in overlap unit 142, Figure 2, are transferred over wires such as 186, to the price selecting unit shown in Figure 25, which is analogous to that shown in Figure 4. In Figure 25 the index selection is set up on code disc selector 591 precisely in the manner hereinbefore described in connection with code disc selector 268 in Figure 4; that is, the selection is impressed on selector magnets 592 to effect through selector levers 593 and transfer levers 594 the proper setting of the code discs in selector 591, when clutch trip magnet 595 is energized over a circuit similar to that energizing magnet 193 (Figure 4). Magnet 595 thus being energized pulls its armature 596, to release stop disc 597, thus permitting rotation of motor driven shaft 598, which in turn through cam 599 mounted thereon effects oscillation of lever 601 to shift the code discs, essentially as previously described.

Thus angular rotation of shaft 602 of code disc selector 591 is selectively determined by the cooperation of stop arm 603 and one rod 604 as previously set forth to effect the operation of an index barrel (not shown) similar to the index barrel 324 shown in Figure 11.

Analogous to code disc selector 269, 270 and 271, (Figure 4) are the permutation relay sets 605, 606 and 607 (Figure 25), respectively. Since relay set 606 is a duplicate of relay set 605, it is shown merely in outline. It is noted that selectors 269, etc. are adapted to set up a mechanical condition to control through mechanical connections the setting of an indicator dial. In analogy thereto, permutation relay sets 605, etc. are adapted to set up an electrical condition to control through electrical connections the setting of an indicator dial.

The arrangement of indicators 571 in stock unit 608, Figure 25, is identical to that in stock unit 267 shown in Figure 8.

Current is impressed on relay magnets 609, Figure 25, over circuits similar to those energizing selector magnets 184 in Figure 4. Thus relay magnets are energized in permutations corresponding to the code shown in Figure 24, the X indicating those magnets which are to be energized. This code is self-explanatory and it is understood that any other suitable code may be adopted, if desired.

Assuming that it is desired to exhibit the numeral "two" in the "hundreds" dial in the top row of stock unit 608, it is observed that in accordance with the code shown in Figure 24, only the top relay magnet 609 in permutation relay set 605 is energized. In consequence thereof the armatures associated with top magnet 609 are pulled up to close front contacts 612 and 613 and open back contact 614.

The following circuits thus are completed first: from positive battery through contact 615 over wire 616, through contact 617, over wire 618, through resistance 619, over wire 621, through windings 575 of the vertical row of dials (which windings are connected in series) thence over wire 623 to ground. It is noted that current also passes from wire 621 over wire 624, through winding 625 of the "hundreds" dial thence over wire 623 to ground. Thus weak positive current is impressed on windings 575 and 625 due to the presence of resistance 619 in the circuit.

A second circuit is completed from positive battery through contact 615 over wire 616, through contact 626, over wire 627, thence through resistance 628 over wire 629 through windings 576 (which are connected to series) thence over wire 623 to ground. It is noted that current also passes from wire 629 over wire 632, through winding 633 of the "hundreds" dial thence over wire 623 to ground. Thus weak positive current is impressed on windings 576 and 633 due to the presence of resistance 628 in the circuit.

No current is at this time impressed on windings 577, since no circuit therefor is completed. Each of the dials in the "tens" row thus have their respective windings 575 and 576 energized so that all of the associated indicator drums 588 tend to rotate to a position which is the resultant of the fields of the respective energized windings.

The next step in the cycle of operations would be analogous to that previously described in connection with Figures 11 and 12. This step consists in energizing the solenoid 253'' to effect the unlatching of the desired indicator dial 571 substantially as previously described. The released dial will thereby be permitted to rotate to its selected position to exhibit the proper digit, after which all the circuits will be broken and the apparatus restored to normal in readiness to receive a succeeding selection.

In this connection it is noted that a strong current is impressed on an armature winding when there is no resistance 619 or 628, etc. in the energizing circuit. That is, the determination of a strong or a weak current is governed by the absence or introduction of a resistance in the circuit.

The various circuits controlled by the permutation relay sets 605, 606 and 607 are similar to that described above and may readily be traced for each numeral or fraction by referring to the code shown in Figure 24.

In this modification it will be apparent that the control for the "tens" dial also controls the "hundreds" dial, since the wires therefor are multipled. If the index barrel previously set by selector unit 591 releases the "hundreds" dial, obviously the setting of magnet 609 will set the "hundreds" dial only. If the index barrel releases the "tens" indicator the "hundreds" dial will remain stationary and the "tens" dial will operate.

It will be noted that the fourth relay of unit 605 (Figure 25) operates to put positive or negative on wires 616 and 616'. Obviously, therefore, a great number of selective positions for the indicator drums are possible by a combination of positive and negative and weak and strong currents on the windings 575, 576 and 577. In a quotation board of the nature described it is only necessary to have eleven possible positions for each dial and therefore the code shown in Figure 24 may be used, but it is obvious that if this modification of the invention were used with indicators requiring a greater number of positions the combination of positive and negative with weak and strong currents on the three coils 575, 576 and 577 will give a far greater number of positions for an indicator dial or drum associated therewith.

*Modification embodying a revertive type of selector*

Another modification of price selecting unit is shown in Figure 26. This adaptation is analogous to that shown in Figure 4, and previously described and should be read with Figures 2 and 3, hereinbefore described, to complete the receiving station for the employment of this modification.

It is contemplated that the price selecting unit shown in Figure 26 may if desired be substituted for unit 185 shown in Figure 4 and used in connection with the preferred embodiment of this invention hereinbefore described and illustrated in Figures 1, 2, 3 and 8 to 15 inclusive. Referring to Figure 26 it is noted that shafts 651 are analogous to shafts 278 in Figure 4. Rotation of shafts 651 controls rotation of the indicator dials. A prime mover tends at all times to rotate shafts 651 through a friction clutch (not shown). It is understood that contact arm 653 and ratchet 656 are mounted on the same shaft 651, but for clarity of illustration are shown offset in Figure 26.

Mounted on individual shafts 651 for rotation therewith are contact arms 653 adapted to complete energizing circuits for individual magnets 654, which circuits were prepared by permutation relays 655 in accordance with received code combinations.

Fixedly mounted on individual shafts 651 for rotation therewith are individual ratchets 656 adapted to cooperate with individual armatures 657 to determine the proper setting of the indicator dials to exhibit the selected digit.

The number of teeth on individual ratchets 656 vary in accordance with the number of selective positions they control; for example, the ratchet at the left of Figure 26 being associated with the index selector is provided with fourteen teeth to agree with the number of index possibilities. The second and third ratchets from the left are each provided with eleven teeth to agree with the number of radial positions on the indicator dial namely 0 to 9 and one blank position. Similarly, the right hand ratchet is provided with eight teeth to correspond to the seven fraction possibilities and one blank position.

Associated with each contact arm 653 is a selector dial 658, said dial being provided with a number of contacts 659 equal to the number of teeth in its associated ratchet 656.

Circuits extend from each of said contacts 659 over individual wires 661 to individual contacts on permutation relays 655. The circuits for relays 655 are selectively controlled by corresponding storing contacts 183 in the overlap unit 142, Figure 2, over the interconnecting wires such as 186.

Figure 26 illustrates the circuit in its normal operative condition; that is, individual shafts 651 are tending to rotate but are restrained therefrom by their respective armatures 657. Timing contact cam shaft 662 likewise is tending to rotate but is restrained therefrom by the cooperation of stop disc 663 with the armature 664 of stop magnet 665. In the operative condition the permutation relays 655 remain energized in accordance with the last received code until reception of a succeeding code.

Thus considering, for example, the left-hand or index selector 658, it is noted that the bottom relay only has been energized in accordance with the previously received code and has been locked up by a locking circuit extending from positive battery through closed contact 666, over common wire 667, through winding of relay 655' and contact 668 to ground. (Each relay 655 is similarly self-locking.) An energizing circuit for relay 654 associated with the left-hand selector thus is completed from positive battery through closed contact 696, over wire 671, successively through contacts 672, 673, 674 and 675 of the permutation relays, thence through selector contact 676, over contact arm 653, through contactor 677, over wire 678, through winding of relay 654, over common wire 679 to ground. Thus energization of magnet 654 causes its associated armature to be pulled up to break contact 681.

The remaining selectors 658 are similarly affected and while all the selectors 658 are in this condition the price selecting unit shown in Figure 26 thus is in readiness to receive the succeeding code.

The first event in the cycle of operations is energization of magnet 665 by the completion of a circuit from positive battery through winding of magnet 665, over wire 194, through contact 187 (in overlap unit 142, Figure 2) to ground. Armature 664 and its associated cams effect the opening momentarily of contacts 666 and 669 to break the previously described locking circuits for permutation relays 655, 655' etc. and relays 654.

De-energization of each relay 654 causes release of its associated armature to effect closing of contact 681. Magnets 682 thus are energized by a circuit from positive battery, through contact 681, through winding of magnets 682, over wire 679 to ground. Energization of magnets 682 thus causes armatures 657 to be pulled up to effect release of ratchets 656 for rotation. Each shaft 651 and consequently contact arms 653 and ratchets 656, will thereby rotate until stopped by armature 657, in the following manner.

Contacts 666 and 696 are again closed and energizing circuits for permutation relays 655 are complete so that they may operate in accordance with the received codes, and locking circuits therefor are completed through contact 666 as previously described.

The next event in the operation is the selective energization of magnets 655 by the overlap unit 142, Figure 2.

Assuming, for example, that permutation relay 655'' of the index permutation set is the only one of that set selected, armature 683 will be pulled up to close contact 684 and this magnet will lock itself by its contact 668. Relay 655' having become de-energized has effected the opening of front contact 672 and the closing of back contact 685. Thus selector contact 686 has become impressed with a potential to prepare an energizing circuit for relay 654. Thus when contact arm 653 in its rotation moves over selector contact 686 the previously mentioned energizing circuit for magnet 654 will be completed from positive battery through contact 669, over wire 671, thence successively through contact 685, 684, 688, 687, over individual wire 661, through contact 686, over contact arm 653, and contactor 677, over wire 678, through winding of relay 654, over wire 679 to ground.

Energization of magnet 654 again causes its armature to be pulled up, thus breaking the previously described energizing circuit for magnet 682 by opening contact 681. De-energization of magnet 682 thus causes release of its armature 657 to engage at the proper time the ratchet tooth corresponding to selector contact 686. Angular rotation of shaft 652 individual to the range selector thus is selectively determined to effect the operation of an index barrel (not shown) similar to index barrel 324 shown in Figure 11.

Likewise the angular rotation of the remaining shafts 652 individual to the "tens", "units" and "fractions" selectors is selectively determined to effect the proper setting of the indicator dials or drums preparatory to their being released or unlatched as previously set forth in connection with Figure 11.

*Modification embodying an electro-pneumatic type of stock board*

A further modification of this invention is disclosed in Figures 27, 28, 29 and 30, and 31. In this embodiment the stock board is similar in external appearance to that shown in Figure 8. However, in the present embodiment the stock board is composed of horizontal sections, each section comprising a selecting means which controls a plurality of stock units. Any desired number of such stock units may be included in each horizontal row and any desired number of horizontal rows may be vertically arranged to comprise a complete stock board.

Each horizontal section comprises a rectangular box-like structure 701, Figure 27, the front face 702 of which is provided with a plurality of groups of rectangular apertures 703, behind which are positioned indicator drums 704.

One difference in the arrangement of drums 704 is that in the present case there is a "hundreds" drum for every index of the stock, whereas in the previous embodiments only the top row in each stock unit was provided with a drum for the "hundreds" digit. The apertures 103 of Figure 27 are those necessary to display the complete quotation for one stock, the upper horizontal row being "Close" for example, the remaining rows being for "Open", "High", "Low" and "Last", as previously described.

Indicator drums 704 are cylindrical in form and are of thin material and are provided on their circumferential face with the numerals to be exhibited. Drums 704 are mounted for rotation on vertical shafts 705, one shaft being provided for each vertical row of apertures in each horizontal section 701 and one drum 704 being positioned behind each aperture 703 to exhibit its numerals therethrough.

To the rear and individual to each shaft 705 and parallel thereto is shaft 706 on which are fixedly mounted for rotation therewith setting arms or directors 707 and an actuating lever 708 (Figure 28); one director 707 is provided for each indicator drum 104 and one lever 708 is provided for each shaft 706.

Levers 708 are pivotally articulated to their respective actuating bars 709 which in turn are adapted to be selectively positioned longitudinally in accordance with received code combinations by a pneumatic aggregate motion device, presently to be described.

Rotative motion is imparted to individual shafts 706 by reciprocative action of bars 709 upon their associated levers 708. It is noted in Figure 27, that one bar 709 is provided for each price characteristic, as for instance the "hundreds", "tens", "units" and "fractions" digits; and that each bar extends the entire length of the section 701 and that levers 708 are connected to the same bar for corresponding shafts 706 in the several stock units, that is, each "hundreds" shaft 706 is connected to the "hundreds" bar 709, each "tens" shaft 706 is connected to the "tens" bar, and similar connections for each shaft 706.

Loosely mounted on each shaft 706 and individual to each drum 704 is a locking lever or detent 711, a control lever 712 and a pair of arms 713 and 714, which together comprise means for controlling the angularity of rotation of the associated drum 704.

Each director 707 is provided with a downwardly extending stop member 715 and likewise each control lever 712 is provided with an upwardly extending stop member 716, which stop members are adapted to cooperate with the arms 713 and 714 to control the degree of rotation of drums 704 as hereinafter set forth. Each pair of arms 713 and 714 are under tension of a common spring 717 which tends to draw each arm toward their common stop members 715 and 716.

Each control lever 712 is provided with a segmental rack 718 adapted to intermesh with pinion 719 loosely mounted on shaft 705 and fixed to indicator dial 704. Each detent lever 711 is provided at one end with teeth which are adapted to engage with their associated pinion 719; said detent levers constantly tend to rotate in a clockwise sense (as viewed in Figure 28) into locking engagement with said pinions under tension of common spring 721. Although the preferred form has been shown in Figure 28, in which one spring 721 influences a pair of detents 711, 711', it is understood that said detents may thus be influenced by individual springs.

Detents 711, 711', etc. are provided on their arms 722 with a vertically disposed pin 723 which is adapted to engage with shoulders 724 on link members 725. Each link 725 extends the width of one set of dials for a stock or across four dials. Link members 725 thus are adapted to control simultaneously the rotation of detent levers 711 associated with the four indicator drums 704 that comprise each stock price.

Link 725 is provided with an upturned member 726 adapted to co-act with a pawl member 727 pivotally mounted on index pull-bar 728. Said pawl member 727 normally tends to rotate in a clockwise sense under the influence of spring 729 to engage vertically disposed tripper bail 731. Tripper bail 731 is provided with laterally disposed ends 732 and is pivoted therethrough to the top and bottom plate of section 701. Said bail 731 is normally held against stop 733 by the action of spring 729 imparted to it through pawl 727. Counter-clockwise motion is imparted to tripper bail 731 by stock selector magnet 730 (Figure 27) appropriately mounted substantially midway of the height of said bail and operably connected to said bail by link 740.

When magnet 730 is energized it attracts its armature to which one end of link 740 is connected and thus imparts counter-clockwise motion (as viewed in Figure 28) to bail 731, which in turn causes pawl members 727 associated therewith to rotate in a like sense so that their ends 734 move into operative relationship with their associated stop members 726.

Having reference to Figure 27 it is observed that there are five pull bars 728, one for each horizontal row of dials, each pull bar being secured to a piston rod 735 of a piston 736 adapted to operate in cylinder 737. Normally, compressed air is supplied through conduit or tubing 738 to space 739 to the left of piston 736 to set pull bar 728 in its right hand or inoperative position. Then when it is desired to urge pull bar 728 to the left to render it operative air pressure on piston 736 is reversed by cutting off the supply thereof from conduit 738 and admitting a supply through conduit 741, thus urging the piston and its associated pull-bar to the left.

Similarly, each bar 709 is operably connected to the first piston of a pneumatic aggregate motion device individual to each of said bars. Each aggregate motion device comprises, in the present instance, a pair of floating cylinders 743 each of which is provided with two isolated compartments. Fitted within each compartment and adapted to operate therein is piston 744. Piston 745 associated with the end piston, as shown, is fixed to end wall 750 of the section 701. Piston rod 746 is common to the two intermediate pistons 744, and piston rod 747 associated with the right end piston 744, is operably connected to actuating bar 709. Each compartment is provided with ports connected to conduits 748 disposed one on each side of piston 744.

Having reference to Figures 29 and 30, which are longitudinal sectional views of the aggregate motion device, it is noted that Figure 29 represents the device in its fully contracted condition, and Figure 30 represents the device in its fully expanded or extended condition. It is apparent that a number of intermediate positions may be obtained by selectively determining the reversals of pressure on the respective pistons 744 which in the present embodiment are controlled by electromagnetically operated valves 749, mounted on end wall 750, Figure 27, and shown schematically in Figure 31.

Briefly, referring to Figures 29 and 30, the length of the compartments of cylinders 743 are so graduated that their permutations will result in positioning individual bars 709 in any predetermined position. For example, in the present embodiment compartment 751, Figure 29, is of such dimension that its piston 744 will move one unit of length; compartment 752 is of such dimension that its piston 744 will move (relative to the cylinder) two units of length; similarly, compartments 753 and 754 are alike and of such dimension that their piston will move relative to the cylinders four units of length.

In the present embodiment of this invention, the bars 709 must be able to assume eleven positions for a blank and ten numerals, namely 0 to 9. However, it will be clear that if a set of dials are used wherein more than eleven positions are necessary, this aggregate motion may be used to give a greater number of positions.

The eleven positions aforementioned are obtained by the use of the four chambers 751 to 754 in all of their permutative possible conditions. For example, the first position may be had by the sole movement of the piston 744 of chamber 751, the second by the movement of the piston in chamber 752, the third by both 751 and 752, the fourth by 753, the fifth by 753 plus 751, the sixth by 753 plus 752, etc. This series of permutation is well known and has come to be recognized as the aggregate motion progression. By proceeding with the described system, it will be seen that the four given chambers 751 to 754 will afford a total of eleven permutative conditions.

As will appear more fully hereinafter, the supply of air to each side of pistons 736 and 744 is electrically controlled. Flow of air to each pair of conduits 748 individual to each compartment is controlled by a valve 749, each valve piston 760 comprising essentially an integral part of the movable core of solenoid 788. Valve piston 760 is normally held in a position away from its solenoid by helical spring 755, when said solenoid is de-energized; but when the solenoid is energized the armature core thereof is drawn in and consequently the valve piston associated therewith is shifted to effect the reversal of air pressure on the respective piston 736 or 744.

*Electrical circuit for electro-pneumatic board*

A brief description of the electrical circuit associated with this modification of the invention will now be given before proceeding with a description of the general operation.

Figure 31:
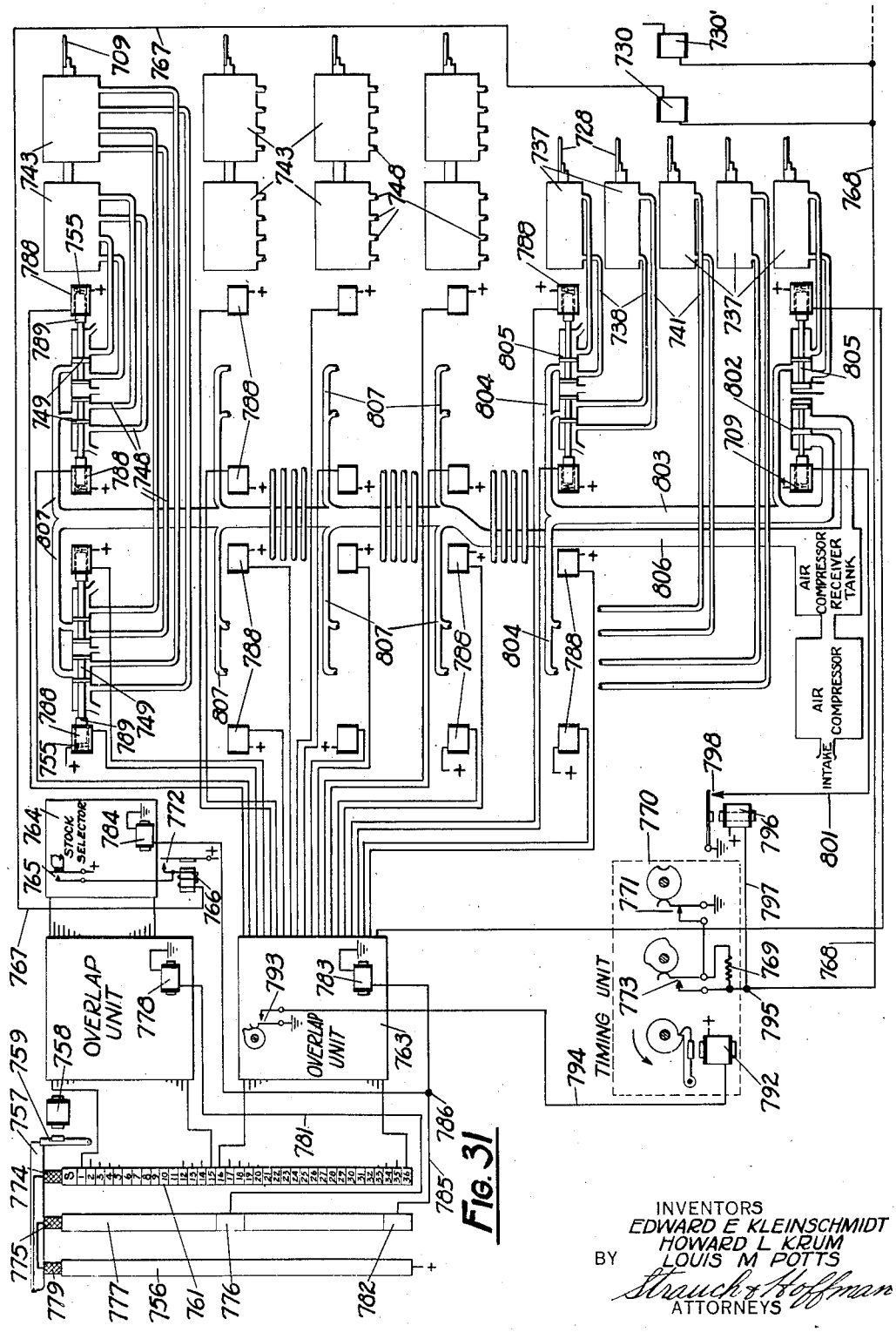
Figure 31 is a diagram of electrical circuits and pneumatic equipment for a receiving distributing arrangement used in connection with the modified form of stock indicator unit shown in Figure 27.

Referring to Figure 31, it is noted that only that part of the receiving distributor necessary to a disclosure of the present modification is shown, since that part, not shown, to the left of distributor ring 756 is substantially identical to similar parts shown in Figure 2.

As brought out in connection with Figure 16, to initiate the rotation of the distributor arm 757, Figure 31, start magnet 758 is energized by a start impulse to actuate armature 759 to effect the release of the arm 757 in a manner similar to that previously described for start magnet 122, Figure 2.

Similar to the receiving apparatus shown in Figure 2, and previously described, the received impulses, being of both positive and negative polarity, affect a polar receiving relay (not shown) to effect through the segments in ring 761 energization of the selecting magnets (not shown) in overlap units 762 and 763, which in turn effect through mechanical means the closing of message-storing contacts, similar to those previously described for overlap units 141 and 142, Figure 2.

However, in this instance, it is noted that segments one to fifteen on ring 761 are each electrically connected to associated selector magnets in overlap unit 762. Likewise segments sixteen to thirty-six are electrically connected to associated selector magnets in overlap unit 763. Hence, that part of the complete stock quotation which pertains to the name of the stock is stored up in overlap unit 762; and that part pertaining to the price of the stock and the index is stored up in overlap unit 763. In the present modification segments are provided for the "hundreds" characteristic of the price, which was not the case in the preferred embodiment or the previous modifications. As will be apparent from the following description, there is a "hundreds" dial for each quotation, that is, for the "Last", "High", "Low", "Open" and "Close", there are four dials to give a complete quotation for each operation.

Storing contacts in overlap unit 762 are electrically connected to individual selector magnets in stock selector unit 764 precisely as in the case of stock selector unit 171 (Figure 3) previously described. When an individual contact 765 in stock selector unit 764 is closed in the manner similar to that described for unit 171, energizing circuits are prepared for an individual magnet 730 (also shown in Figure 27) from positive battery, through contact 765, through winding of locking relay 766, over wire 767, through winding of magnet 730, over wire 768, through resistance 769 and contact 771 in timing units 770 to ground. Energization of relay 766 causes its associated contact 772 to close to lock up the previously described circuit, which is broken at a properly timed interval by cam operated contact 771. It is noted that magnet 730 is marginal and is not operated at this time but becomes operative later when cam operated contact 773 is closed to shunt out the resistance 769.

After brush 774 on distributor arm 757 moves off the fifteenth segment on ring 761 energizing circuits for selector magnets in overlap unit 762 have been completed to selectively determine the stock to be affected. This part of the cycle having been completed, brush 775 then contacts with segment 776 on ring 777 to complete an energizing circuit for start magnet 778 in overlap unit 762 from positive battery, through ring 756, brushes 779 and 775, segments 776 (with which brush 775 is now in contact), over wire 781, through winding of magnets 778 to ground. Thus energization of magnet 778 initiates operation of overlap unit 762 to effect transfer of the message to the storing contacts as described hereinbefore.

Now, while overlap unit 762 thus is functioning, the selector magnets in overlap unit 763 are being energized in accordance with the received code by brush 774 traversing segments sixteen to thirty-six. Near completion of the revolution of distributor arm 757, brush 775 traverses segment 782 of ring 777 to complete, simultaneously, energizing circuits for start magnets 783 and 784 in overlap unit 763 and stock selector 764 respectively, thus initiating the operations thereof. Energizing circuit for magnet 783 extends from positive battery through ring 756, over brushes 779 and 775, through segment 782 (with which brush 775 is now in contact), over wire 785, through winding of magnet 783 to ground. This circuit is divided at 786 to complete, simultaneously, a circuit over wire 787 through winding of magnet 784 to ground.

Operation of overlap unit 763 thus causes energizing circuits for selected solenoids 788 to be completed in a manner hereinbefore described for selector magnets 184 in Figure 4, thus causing cores 789 to be drawn into the solenoids against the action of individual springs 755, to effect the reversal of air pressure on the sides of selected pistons 736 and 744 as previously set forth.

Start magnet 792 of the timing unit is operated at the proper instant when its energizing circuit is completed by the closing of cam operated contact 793 in overlap unit 763, which circuit extends from positive battery, through winding of magnet 792, over wire 794, through contact 793 to ground.

Energizing circuit for magnet 730, previously traced, is divided at 795 and an energizing circuit for slow-acting relay 796 may be traced from positive battery, through winding of relay 796, wire 797, resistance 769, and contact 771 to ground. Magnet 796, like magnets 730, is marginal and becomes operative simultaneously with the selected stock magnet 730, that is, when cam operated contact 773 is closed to shunt out resistance 769. Energization of relay 796 effects closing of its associated contact 798 to complete an energizing circuit for solenoid 799 from positive battery through winding of solenoid 799 over wire 801 through contact 798 to ground.

Solenoid 799 thus energized causes its core to be drawn in to effect shifting of valve 802 to permit admission of compressed air into header conduit 803. Conduit 803 is provided with branches 804 adapted to supply air through valves 805 to cylinders 737, which control the index of the stock such as "Close", "Open" or the like.

In this connection it is noted that compressed air is supplied directly from the air compressor receiver tank through conduit 806 and its branches 807, thence through valves 749 to the cylinders 743; whereas the supply of compressed air conveyed through conduit 803 is valve-controlled at 802.

In Figure 31, valves 749 are shown in their normal setting or position in which solenoids 788 are de-energized. At this time compressed air is supplied to cylinders 743 so that the aggregate motion devices will assume their contracted or condensed form as shown in Figure 29. On the other hand when all solenoids 788 are energized simultaneously valves 749 will be shifted so that compressed air will be supplied to cylinders 743 such that the aggregate motion device will assume its extended or expanded form as shown in Figure 30. Various intermediate positions are obtainable by operation of the valves in combinations.

*General operation*

Assuming that a stock quotation is to be exhibited in accordance with a received code combination, the message upon its reception is at first distributed to the overlap units 762 and 763. During the interval when overlap unit 762 and stock selector 764 are functioning to selectively determine the stock unit to be operated by selective movement of one stock bar, energization of solenoids 788 controlling valves 749 is being selectively determined, through the medium of overlap unit 763; thus an overlap is provided wherein the selection of both the particular stock to be operated and the price thereof may proceed practically simultaneously, so that by the time the tripper bail 731 (Figure 28), of the selected stock is to be operated the aggregate motion device will have been operated to properly determine the angularity of rotation of the drums 704. Then finally the index cylinder 737 will be operated to effect the release of the selectively determined drums 704. The following is a detailed description of the operation.

The parts are shown in a position of normal rest in Figure 31. When a start signal is received, start magnet 758 is energized to release the distributor arm 757 for rotation, brush 774 contacting with segments 1 to 15 on ring 751 to selectively operate the magnets in overlap unit 762 in a manner previously described. After this transfer has been made, segment 776 is engaged by brush 775 to operate start magnet 778 of overlap unit 762 over a circuit previously described to transfer the setting of this overlap unit to stock selector 764. The stock selector is not operated at this time since its start magnet 784 is not yet energized.

Continued rotation of distributor arm 757 carries the brush 774 into contact with segments 16 to 36 to selectively operate magnets in overlap unit 763. After this transfer has been made, segment 782 is engaged by brush 775 to energize start magnet 783 of overlap unit 763 and start magnet 784 of stock selector 754 over obvious circuits. When stock selector 754 operates, one stock bar causes engagement of its contact 765 to select one stock magnet 730 for subsequent operation over positive, to closed contact 765, locking magnet 766, wire 767, selected stock magnet 730, wire 768, resistance 769, normally closed contact 771, to ground. Since stock magnet 730 is marginal it will not be operated as long as resistance 769 is connected in the circuit.

Release of overlap unit 763 by energization of its start magnet 783, transfers the setting of the contacts thereof to the various magnets 788 to selectively position the valves for controlling the quotation on the "hundreds", "tens", "units", "fractions" dials of the selected stock, and also to select the index thereof such as "Close", "Open", or the like. Since air under pressure is always supplied to conduit 806 and branch conduits 807, the new positions of the valves 760 operate the "hundreds", "tens", "units", and "fractions" cylinders 743 at once to their new positions in accordance with the new quotation.

This newly selected position for cylinders 743 will move bars 709 to a new position. One bar 709 (the "hundredths" bar) is connected to the "hundreds" shaft 706 of each stock in the horizontal rows. It will be understood that similar shafts 706 in other horizontal rows of stock will be similarly operated at this time, either by a continuation of the shafts 706 both above and below the horizontal units 701 shown in Figure 27, or the valves 760 may be connected to multiple conduits to operate a multiplicity of cylinders 743, or by other obvious means. Similarly the "tens" cylinder 743 operate each "tens" shaft 706 by way of bar 709, each "unit" shaft and "fraction" shaft being similarly moved.

Referring now to Figure 28, movement of individual shafts 706 is accomplished by the directors 707 connected thereto. Each "hundreds", "tens", "units" and "fractions" director 707 is therefore caused to rotate a corresponding arc in accordance with the movement of its bar 709, each director carrying with it by means of the downwardly extending end 715 either arm 713 or 714 disposed in its path of movement. The unmoved arm 713 or 714 is at this time restrained from movement by its latching engagement with upturned end 716 of arm 712. It will be recalled that levers 713, 714 and 712 are loosely mounted on shafts 706. Lever 712 is at this time restrained from movement by its meshing engagement with pinion 719 on its shaft 705, said pinions being locked against rotation by engagement of detent racks 711.

Spreading of arms 713 and 714 above described tensions their common springs 717, since one arm is moved, and the other arm is held stationary by lug 716. Thus each "hundreds", "tens", "units", "fractions" shaft 706 has rotated and has tensioned interconnected mechanism to move the "hundreds", "tens", "units", "fractions" dial of any released stock unit.

The next step in the operation is to energize magnet 730 of the selected stock, which as previously stated, does not operate until resistance 769 is short-circuited. It will be recalled that one trip bail 731 is provided for each stock and is connected with the individual magnet 730 thereof by link 740. Referring to Figure 28 it will be seen that movement of bail 731 upwardly in response to energization of magnet 730 will cause counter-clockwise rotation of its individual pawl 727 into the path of movement of stop 726 on link 725 of the selected stock.

Operation of overlap unit 763 serves to close contact 793 to energize start magnet 792 of timing unit 770 over an obvious circuit. Therefore, the next operation is closing of contact 773 to short-circuit resistance 769 whereby the selected stock magnet 730 is operated by the increased current over its circuit. This operation moves bail 731 of the selected stock as above described.

The next operation to be performed is to selectively operate the index of the stock whereby the "Open", "High" or the like quotation dials will be operated. This is accomplished by closing of contact 798 by slow acting marginal magnet 796. As long as resistance 769 is connected in circuit the marginal magnet 796 does not operate, but when this resistance is short-circuited by engagement of contact 773, magnet 796 operates but it is slow acting and its armature does not close contact 798 until selected magnet 730 has had time to operate its bail 731 as above described. When contact 798 is closed, valve 802 is operated by energization of its magnet 799 from positive, over magnet 799, wire 801, closed contact 798 to ground.

Operation of valve 802 puts air into conduit 803, the branches 804 of which lead to the index selecting cylinders 737. Magnets 788 controlling valves 805 having previously been set, air is now admitted to one or more of the selected index cylinders 737. If a "Close" quotation only is to be changed, air will be admitted to this cylinder only. If two or more quotations are to be made simultaneously, for example "High" and "Last", both the High" and "Last" cylinders 737 will be operated at this time. Admission of air into the selected cylinder or cylinders 737 will move the selected bars 728 to the left of Figures 27 and 28.

It will be observed that each pull bar 728 has a plurality of pawls 727 thereon vertically arranged to be operated by the individual bail 731 in each stock unit. Thus when each bar 728 is reciprocated all pawls 727 mounted thereon are likewise reciprocated but only those pawls are operative which have been acted upon by a selectively determined bail 731. Thus a selected horizontal row of dials will be released by longitudinal movement of its bar 725 to rotate detents 711 counterclockwise against tension of springs 721, by way of pins 723 in engagement with shoulder 724 on links 725. Thus one horizontal row of dials corresponding to the selected index of the selected stock is released. Springs 717 then at once pull the unmoved levers 713 or 714 until said levers engage stops 715 of directors 707. This movement of each lever 713 or 714 carries with it the lever 712 by engagement of portion 716 on lever 712. Since rack portion 718 of each lever 712 meshes its pinion 719 of its dial, each dial is moved into its new position in accordance with the quotation. It will be recalled that each dial is loosely mounted on its shaft 705 for free rotation with respect to its shaft.

From Figure 31 it will be apparent that the distributor arm 757 will continue rotation in an uninterrupted manner to proceed with a subsequent quotation while the parts above described are operating. Thus a complete overlap is provided whereby there need be no interruption in quotations.

Continued rotation of the timing unit shaft serves to break contact 771 whereby the previously selected stock magnet 730 is deenergized, locking magnet 766 adjacent the stock selector opens, and the circuit is broken to the marginal slow acting magnet 796. This serves to de-energize magnet 799 and valve 802 returns to its position for preventing entrance of air under pressure to conduit 803. After one revolution of the timing unit the shaft thereof is stopped by the armature of magnet 792, the circuit for said magnet having previously been broken at contact 793.

From the previous description of overlap units 141 and 142 corresponding to units 762 and 763 it will be understood that the circuits closed therein are opened after these units are operated, thereby de-energizing the magnets 788. Springs 755 therefor shut off the air to the cylinders 743. Springs 755 also reverse the passage of air to cylinders 737 and bars 728 return to their initial positions. Detents 711 at once re-engage pinions 719 of the newly set dials to maintain these dials in position. It will be understood that this reversal of air through cylinders 737 will occur before slow acting relay 796 has reversed 802 to cut air off from conduit 803. The parts are thus returned to their initial positions ready for a subsequent quotation, which as previously described, is being made by continued rotation of distributor arm 757.

Although a complete quotation system has been described in Figures 1 to 15, including a transmitting station operated by a cross-perforated tape, and a complete receiving station having a distributor, overlap units, stock selector, price selector, and stock board, it will be understood that all these units are capable of use independently and in combination with other units and in other systems. Furthermore, the various modifications described may be incorporated with the complete system of Figures 1 to 15, either singly or in combination, or they may be used in various other systems or with other different units.

For purposes of illustration this invention has been described in connection with and applicable to a stock price quotation system but obviously it is not so limited, being adapted for use in any system for the distant transmission of intelligence.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:—

1. In a stock quotation board system, a single channel of communication, a plurality of sets of indicators to be selected and controlled, a selector responsive to certain signals transmitted over said channel for conditioning a corresponding set or sets of said indicators including a plurality of selectable elements, means to individually condition said elements in accordance with three selecting signals, and pneumatic means responsive to other signals transmitted over said channel for operating said conditioned set or sets of indicators.

2. In a stock quotation system responsive to Baudot signals, a plurality of indicators each capable of a plurality of display positions, pneumatically actuated operating means common to several of said indicators, means engaging the operating means with the individual indicators whereby the indicators may be individually adjusted by the operating means to display their positions variously, electromagnetic means responsive to said signals for selectively controlling said pneumatic means, and a distributor for receiving said signals from a single channel and translating them through the electromagnetic means to predetermined ones of said pneumatic means.

3. In a stock quotation system, a plurality of indicators arranged in operative alignment, an operating bar variously positionable for predetermining the operation of any of said indicators, spring elements individual to and associated with each indicator for coercing its response to the positions of said bar, signal controlled means for releasing each indicator to respond to its spring element, and pneumatic aggregate motion mechanism responsive to Baudot signals for positioning said bar.

4. In combination, a plurality of indicators, a common operating bar for positioning said indicators in accordance with the degree of its movement, means for associating said bar with predetermined ones of said indicators selectively, signal controlled means for moving said bar including an aggregate motion series of pneumatics operating in tandem, and a selector including a series of control valves communicating between a source of fluid supply and each of said pneumatics, and a corresponding series of electromagnets responsive to control signals for correspondingly operating said series of valves.

5. In a selecting mechanism, an indicator having a predetermined number of angular positions for accordingly displaying associated characters, a pinion secured to said indicator, a bar movable longitudinally for imparting rotary motion to said pinion and indicator, a plurality of housings affording an alignment of chambers varying from each other in geometric progression, pistons connecting said housings, and means for variously and selectively inflating and deflating said chambers for thereby imparting motion to said bar to correspondingly position said indicator.

6. A remote control system including a series of pneumatics arranged in alignment and connected in tandem, a source of fluid supply, means for channeling said fluid supply to certain one or ones of said pneumatics, and a selector mechanism responsive to telegraph signals received over a single channel for permutably channeling said fluid supply by moving said channeling means to supply fluid variously to said pneumatics and thereby to effect a resultant movement equal to the summation of the movements of said aligned pneumatics.

7. In an indicating system, an operating bar, a series of aggregate motion actuators comprising interconnected pistons and cylinders each capable of executing a predetermined degree of movement to impart a corresponding motion to said bar, a plurality of indicators supported in operative relation longitudinally with respect to said bar, a release means associated with each indicator for causing it to assume a position determined by the movement of said bar, and a signal controlled means of fluid supply to be selectively admitted to said cylinders for causing the movement of said pistons permutatively.

EDWARD E. KLEINSCHMIDT.
HOWARD L. KRUM.
LOUIS M. POTTS.